US012638792B2

(12) United States Patent
Kuwabara et al.

(10) Patent No.: US 12,638,792 B2
(45) Date of Patent: May 26, 2026

(54) TENSION ROLLER ASSEMBLY, BELT UNIT, AND IMAGE FORMING APPARATUS

(71) Applicants: Nobuo Kuwabara, Kanagawa (JP); Hiroaki Takagi, Kanagawa (JP)

(72) Inventors: Nobuo Kuwabara, Kanagawa (JP); Hiroaki Takagi, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 39 days.

(21) Appl. No.: 18/760,557

(22) Filed: Jul. 1, 2024

(65) Prior Publication Data

US 2025/0036045 A1 Jan. 30, 2025

(30) Foreign Application Priority Data

Jul. 27, 2023 (JP) ................................ 2023-122663

(51) Int. Cl.

| | |
|---|---|
| ***G03G 15/16*** | (2006.01) |
| ***G03G 15/01*** | (2006.01) |
| ***G03G 21/16*** | (2006.01) |

(52) U.S. Cl.

CPC ..... *G03G 15/1615* (2013.01); *G03G 15/0131* (2013.01); *G03G 15/0189* (2013.01); *G03G 21/1633* (2013.01); *G03G 21/1647* (2013.01); *G03G 21/168* (2013.01)

(58) Field of Classification Search

CPC ........... G03G 15/0131; G03G 15/0189; G03G 15/1615; G03G 21/1633; G03G 21/1647; G03G 21/168; G03G 2221/1642

See application file for complete search history.

(56) References Cited

U.S. PATENT DOCUMENTS

| | | | | |
|---|---|---|---|---|
| 2011/0211855 | A1* | 9/2011 | Kogure .............. | G03G 15/1615 399/66 |
| 2012/0148300 | A1 | 6/2012 | Katoh et al. | |
| 2013/0071150 | A1 | 3/2013 | Takagi | |
| 2021/0223721 | A1 | 7/2021 | Goto et al. | |
| 2023/0393495 | A1 | 12/2023 | Takagi | |
| 2023/0393496 | A1 | 12/2023 | Takagi | |
| 2024/0019803 | A1 | 1/2024 | Takagi | |
| 2024/0036499 | A1 | 2/2024 | Takagi | |
| 2024/0053695 | A1 | 2/2024 | Takagi et al. | |
| 2024/0142898 | A1* | 5/2024 | Yoshikawa ........ | G03G 15/1615 |

FOREIGN PATENT DOCUMENTS

| | | |
|---|---|---|
| JP | 2008-026453 A | 2/2008 |
| JP | 2009-058681 A | 3/2009 |
| JP | 2012-123232 A | 6/2012 |
| JP | 2013-064865 A | 4/2013 |
| JP | 2021-113867 A | 8/2021 |

* cited by examiner

*Primary Examiner* — Sophia S Chen

(74) *Attorney, Agent, or Firm* — Harness, Dickey & Pierce, P.L.C.

(57) ABSTRACT

A tension roller assembly includes a tension roller, a first presser, a second presser, and a pressure releaser. The tension roller contacts an outer circumferential surface of a belt to apply tension to the belt. The first presser presses one end of the tension roller in an axial direction of the tension roller against the belt. The second presser presses another end of the tension roller in the axial direction against the belt. The pressure releaser moves the first presser and the second presser together to release pressure applied to the tension roller by the first presser and the second presser.

20 Claims, 16 Drawing Sheets

TENSION ROLLER ASSEMBLY, BELT UNIT, AND IMAGE FORMING APPARATUS

CROSS-REFERENCE TO RELATED APPLICATIONS

This patent application is based on and claims priority pursuant to 35 U.S.C. § 119 (a) to Japanese Patent Application No. 2023-122663, filed on Jul. 27, 2023, in the Japan Patent Office, the entire disclosure of which is hereby incorporated by reference herein.

BACKGROUND

Technical Field

Embodiments of the present disclosure generally relate to a tension roller assembly, a belt unit, and an image forming apparatus.

Related Art

One type of image forming apparatus known in the art includes a belt unit including a tension roller assembly. The tension roller assembly includes a tension roller contacting an outer circumferential surface of a belt to apply tension to the belt, a first presser to press one end of the tension roller in the axial direction of the tension roller against the belt, and a second presser to press the other end of the tension roller in the axial direction against the belt.

SUMMARY

This specification describes an improved tension roller assembly that includes a tension roller, a first presser, a second presser, and a pressure releaser. The tension roller contacts an outer circumferential surface of a belt to apply tension to the belt. The first presser presses one end of the tension roller in an axial direction of the tension roller against the belt. The second presser presses another end of the tension roller in the axial direction against the belt. The pressure releaser moves the first presser and the second presser together to release pressure applied to the tension roller by the first presser and the second presser.

This specification also describes a tension roller assembly that includes a tension roller, a first pressing arm, a first elastic body, a second pressing arm, a second elastic body, and a pressure releaser. The first elastic body presses the first pressing arm such that one end of the first pressing arm presses one end of the tension roller in an axial direction of the tension roller. The second elastic body presses the second pressing arm such that one end of the second pressing arm presses another end of the tension roller in the axial direction. The pressure releaser contacts another end of the first pressing arm opposite to the one end of the first pressing arm and another end of the second pressing arm opposite to the one end of the second pressing arm and is movable against a force of the first elastic body and a force of the second elastic body.

This specification further describes a belt unit and an image forming apparatus that include the tension roller assembly.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
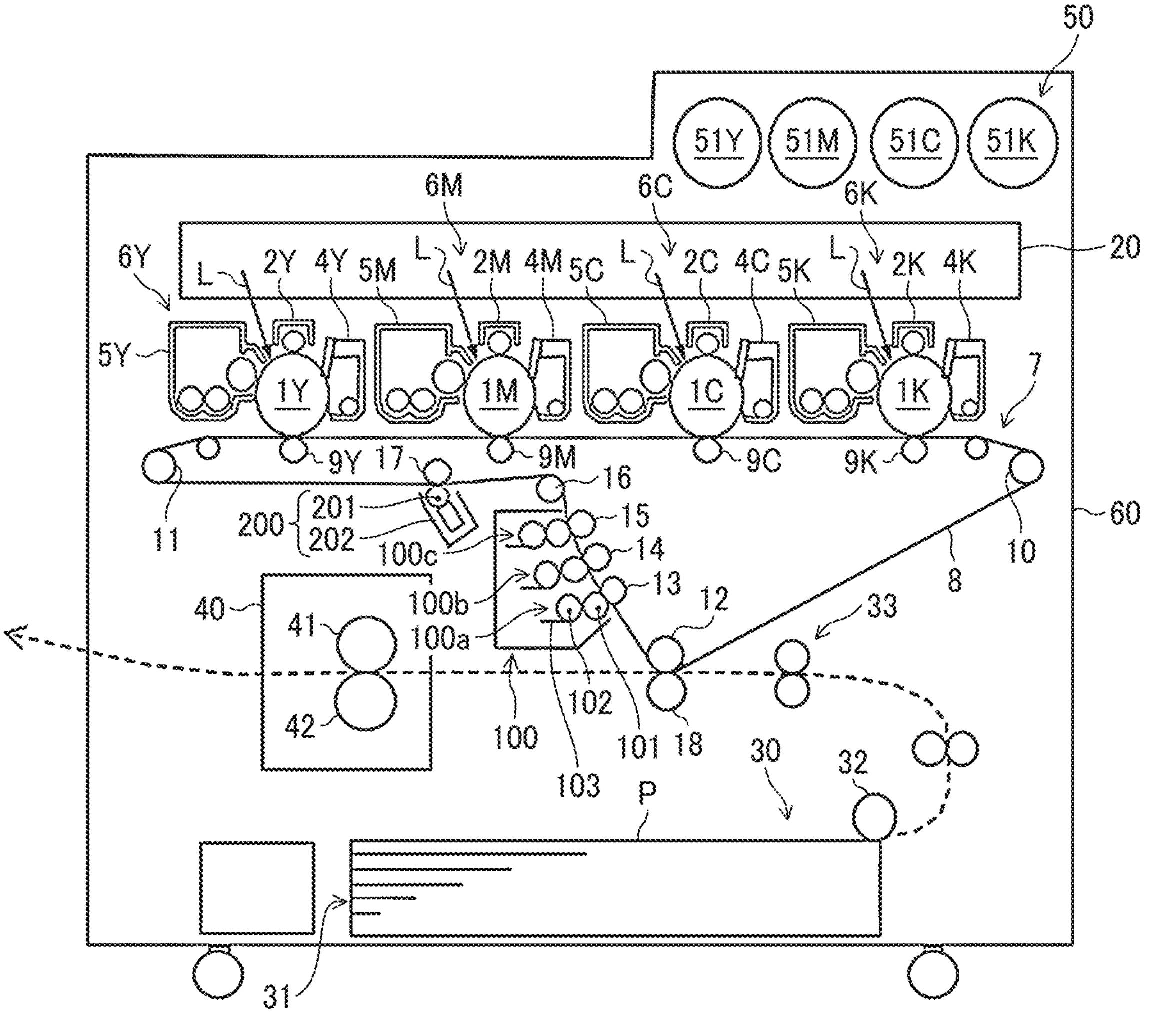
FIG. 1 is a schematic diagram illustrating a configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Descriptions are given below of an intermediate transfer unit and an image forming apparatus with reference to the accompanying drawings. It is to be understood that those skilled in the art can easily modify and change the present disclosure within the scope of the appended claims to form other embodiments, and these modifications and changes are included in the scope of the appended claims. The following description is an example of the best mode of the present disclosure and does not limit the scope of the claims.

A tandem type printer employing an intermediate transfer method is described below as an image forming apparatus 60 according to one embodiment of the present disclosure. Firstly, a description is given of a basic configuration of the image forming apparatus 60. FIG. 1 is a schematic diagram illustrating a configuration of the image forming apparatus 60. The image forming apparatus 60 includes four process units 6Y, 6M, 6C, and 6K for forming yellow, magenta, cyan, and black toner images.

The four process units 6Y, 6M, 6C, and 6K include drum-shaped photoconductors 1Y, 1M, 1C, and 1K, respectively. Around the photoconductors 1Y, 1M, 1C, and 1K, the process units 6Y, 6M, 6C, and 6K include charging devices 2Y, 2M, 2C, and 2K, developing devices 5Y, 5C, 5M, and 5K, drum cleaners 4Y, 4M, 4C, and 4K, and dischargers, respectively. The process units 6Y, 6M, 6C, and 6K use Y, C, M, and K toners that differ in color from each other but have the same configuration except the difference.

Above the process units 6Y, 6M, 6C, and 6K, an optical writing unit 20 is disposed. The optical writing unit 20 irradiates the surfaces of the photoconductors 1Y, 1M, 1C, and 1K with laser beams L to optically write electrostatic latent images thereon. Below the process units 6Y, 6M, 6C, and 6K, an intermediate transfer unit 7 is disposed. The intermediate transfer unit 7 serves as a drawer unit and includes an endless intermediate transfer belt 8. The intermediate transfer unit 7 includes, in addition to the intermediate transfer belt 8, multiple stretching rollers disposed inside the loop of the intermediate transfer belt 8, a tension roller 16, a belt cleaner 100, and a lubrication device 200.

The multiple rollers inside the loop of the intermediate transfer belt 8 include four primary transfer rollers 9Y, 9M, 9C, and 9K, a driven roller 10, a drive roller 11, a secondary-transfer backup roller 12, three cleaning backup rollers 13, 14, and 15, and an application brush backup roller 17. The intermediate transfer belt 8 is stretched around a part of circumferential surface of each of these rollers.

Each of the cleaning backup rollers 13, 14, and 15 may not apply a certain tension to the intermediate transfer belt 8 and may be driven to rotate with the rotation of the intermediate transfer belt 8. A driver drives and rotates the drive roller 11 clockwise in FIG. 1, and the rotation of the drive roller 11 rotates the intermediate transfer belt 8 clockwise in FIG. 1.

The intermediate transfer belt 8 is interposed between the photoconductors 1Y, 1M, 1C, and 1K and the four primary transfer rollers 9Y, 9M, 9C, and 9K disposed inside the loop of the intermediate transfer belt 8. The outer circumferential surface of the intermediate transfer belt 8 contacts the photoconductors 1Y, 1M, 1C, and 1K to form primary transfer nips for transferring a yellow toner image, a magenta toner image, a cyan toner image, and a black toner image. Power supplies each apply primary transfer bias having a polarity opposite to a normal polarity of the toner to each of the primary transfer rollers 9Y, 9M, 9C, and 9K.

The intermediate transfer belt 8 is interposed between the secondary-transfer backup roller 12 disposed inside the loop of the intermediate transfer belt 8 and a secondary transfer roller 18 disposed outside the loop. The outer circumferential surface of the intermediate transfer belt 8 contacts the secondary transfer roller 18 to form a secondary transfer nip.

A power supply applies a secondary transfer bias having the polarity opposite to the normal polarity of the toner to the secondary transfer roller 18. Instead of the above-described configuration, the image forming apparatus 60 may include a sheet conveyance belt stretched over the secondary transfer roller 18, several support rollers, and a drive roller. In this case, the intermediate transfer belt 8 and the sheet conveying belt are interposed between the secondary transfer roller 18 and the secondary-transfer backup roller 12.

The belt cleaner 100 disposed outside the loop of the intermediate transfer belt 8 includes a pre-cleaner 100*a* for roughly removing toner of an untransferred toner image on the intermediate transfer belt 8. The belt cleaner 100 further includes a normally-charged-toner cleaner 100*b* for removing toner charged to the normal charge polarity on the intermediate transfer belt 8. The belt cleaner 100 still further includes a reversely-charged-toner cleaner 100*c* for removing toner charged to a polarity (positive polarity) opposite to the normal charge polarity (negative polarity) of the toner on the intermediate transfer belt 8. The above-described order arranging the pre-cleaner 100*a*, the normally-charged-toner cleaner 100*b*, and the reversely-charged-toner cleaner 100*c* in FIG. 1 is merely an example, and the pre-cleaner 100*a*, the reversely-charged-toner cleaner 100*c*, and the normally-charged-toner cleaner 100*b* may be arranged in this order.

Each of the pre-cleaner 100*a*, the normally-charged-toner cleaner 100*b*, and the reversely-charged-toner cleaner 100*c* includes a cleaning brush roller 101, a collection roller 102, and a scraping blade 103. The collection roller 102 collects toner adhering to the cleaning brush roller 101. The scraping blade 103 comes into contact with the collection roller 102 and scrapes the toner from the surface of the collection roller 102.

A voltage having the polarity (that is, the positive polarity) opposite to the normal charge polarity (that is, negative polarity) of the toner is applied to the cleaning brush rollers

101 in each of the pre-cleaner 100*a* and the normally-charged-toner cleaner 100*b* to electrostatically remove toner having the normally charged polarity on the intermediate transfer belt 8. A voltage having a positive polarity higher than the voltage of the cleaning brush roller 101 is applied to the collection roller 102 in each of the pre-cleaner 100*a* and the normally-charged-toner cleaner 100*b* to electrostatically collect toner having the normally charged polarity adhering to the cleaning brush roller 101.

A voltage having the normal charge polarity of the toner (that is, the negative polarity) is applied to the cleaning brush rollers 101 in the reversely-charged-toner cleaner 100*c* to electrostatically remove the reversely charged toner on the intermediate transfer belt 8. A voltage having a negative polarity higher than the voltage of the cleaning brush roller 101 is applied to the collection roller 102 in the reversely-charged-toner cleaner 100*c* to electrostatically collect the reversely charged toner adhering to the cleaning brush roller 101.

The intermediate transfer belt 8 is interposed between the cleaning brush rollers 101 in the pre-cleaner 100*a*, the normally-charged-toner cleaner 100*b*, and the reversely-charged-toner cleaner 100*c* and the cleaning backup rollers 13, 14, and 15 disposed inside the loop of the intermediate transfer belt 8. The outer circumferential surface of the intermediate transfer belt 8 contacts the cleaning brush rollers 101 in the pre-cleaner 100*a*, the normally-charged-toner cleaner 100*b*, and the reversely-charged-toner cleaner 100*c* to form cleaning nips.

The lubrication device 200 applies lubricant to the surface of the intermediate transfer belt 8 in order to protect the surface of the intermediate transfer belt 8. The lubrication device 200 includes a solid lubricant 202 such as a lump of zinc stearate, and an application brush roller 201 serving as an applicator. The application brush roller 201 contacts a solid lubricant 202 and rotates to scrape the solid lubricant 202 and apply lubricant powder obtained by scraping the solid lubricant 202 to the surface of the intermediate transfer belt 8.

The image forming apparatus 60 includes a sheet feeder 30 including a sheet tray 31 and a sheet feed roller 32. The sheet tray 31 stores a sheet P as a recording medium. The sheet feed roller 32 feeds the sheet P from the sheet tray 31 to a feeding path. The image forming apparatus 60 also includes a registration roller pair 33 disposed on the right of the secondary transfer nip in FIG. 1. The registration roller pair 33 receives the sheet P fed from the sheet feeder 30 and timely forwards the sheet P to the secondary transfer nip.

The image forming apparatus 60 includes a fixing device 40 disposed on the left of the secondary transfer nip in FIG. 1. The fixing device 40 includes a heating roller 41 and a pressure roller 42. The fixing device 40 receives the sheet P sent from the secondary transfer nip and performs a fixing process that fixes the toner image onto the sheet P.

The image forming apparatus 60 includes a bottle storage 50 disposed in the upper right of the optical writing unit 20 in FIG. 1. The bottle storage 50 stores toner bottles 51Y, 51M, 51C, and 51K. The toner bottles 51Y, 51M, 51C, and 51K store yellow toner, magenta toner, cyan toner, and black toner, respectively. The yellow toner, the magenta toner, the cyan toner, and the black toner are supplied to the developing devices 5Y, 5M, 5C, and 5K, respectively, as necessary.

In response to receiving image data sent from a personal computer, a controller in the image forming apparatus 60 controls the driver to drive and rotate the drive roller 11, and the drive roller 11 rotates the intermediate transfer belt 8. Rotating the intermediate transfer belt 8 rotates the rollers inside the loop of the intermediate transfer belt 8 other than the drive roller 11. At the same time, the photoconductors 6Y, 6M, 6C, and 6K in the process units 1Y, 1M, 1C, and 1K start rotating. The charging devices 2Y, 2M, 2C, and 2K uniformly charge the surfaces of the photoconductors 1Y, 1M, 1C, and 1K, respectively. The optical writing unit 20 emits the laser beams L to irradiate the surfaces of the photoconductors 1Y, 1M, 1C, and 1K to form electrostatic latent images on the surfaces.

The developing devices 5Y, 5M, 5C, and 5K develop the electrostatic latent images formed on the surfaces of the photoconductors 1Y, 1M, 1C, and 1K to obtain the yellow toner image, the magenta toner image, the cyan toner image, and the black toner image on the surfaces of the photoconductors 1Y, 1M, 1C, and 1K, respectively. In the primary transfer nips, the yellow toner image, the magenta toner image, the cyan toner image, and the black toner image are primarily transferred and superimposed one on another on the outer circumferential surface of the intermediate transfer belt 8. As a result, a four-color superimposed toner image is formed on the outer circumferential surface of the intermediate transfer belt 8.

Meanwhile, in the sheet feeder 30, the sheet feed roller 32 feeds the sheets P from the sheet tray 31 one by one to the registration roller pair 33. The registration roller pair 33 sends the sheet P to the secondary transfer nip such the nipped sheet P can be synchronized with the four-color toner image formed on the intermediate transfer belt 8, and the four-color toner image is secondarily transferred onto the sheet P all at once. Thus, a full-color image is formed on the surface of the sheet P. The sheet P bearing the four-color toner image is conveyed from the secondary transfer nip to the fixing device 40, and the fixing device 40 performs a fixing process to fix the four-color toner image onto the sheet P.

After the yellow, magenta, cyan, and black toner images are primarily transferred onto the intermediate transfer belt 8, the drum cleaners 4Y, 4M, 4C, and 4K remove residual toner that is not primarily transferred onto the intermediate transfer belt 8 and remains on the photoconductors 1Y, 1M, 1C, and 1K. Further, discharge lamps remove residual potentials from the photoconductors 1Y, 1M, 1C, and 1K, and the charging devices 2Y, 2M, 2C, and 2K uniformly charge the photoconductors 1Y, 1M, 1C, and 1K, respectively, as preparation for subsequent image formation. The belt cleaner 100 removes residual toner that is not secondarily transferred to the sheet P and remains on the intermediate transfer belt 8.

Figure 2:
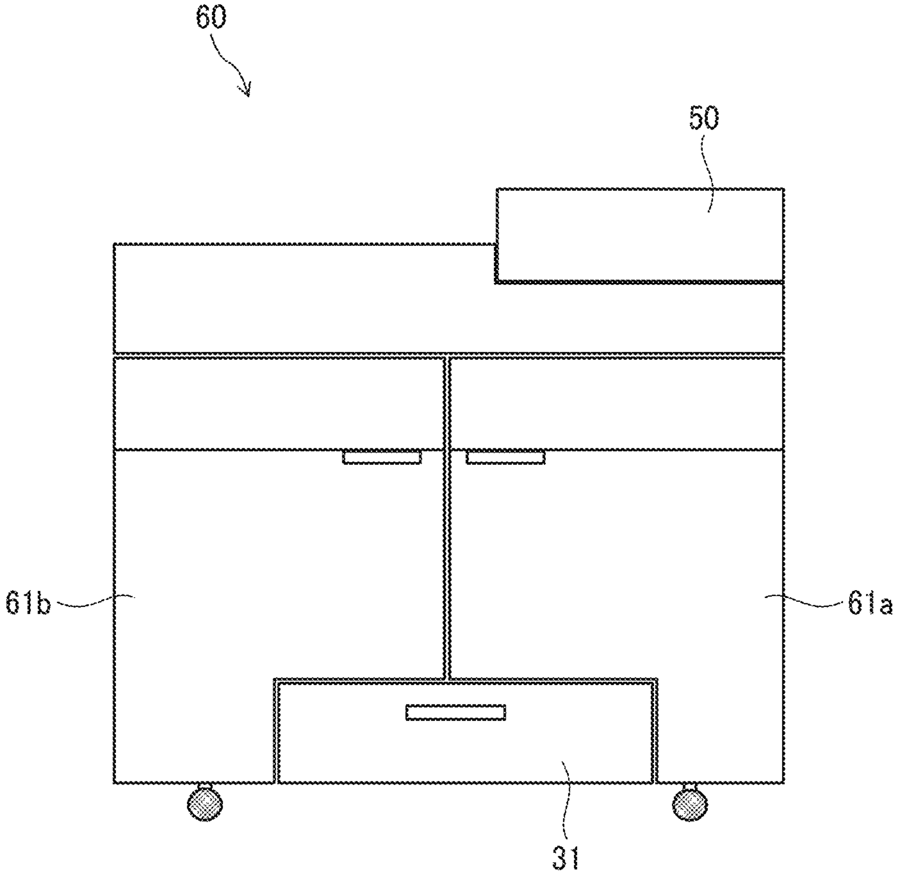
FIG. 2 is a front view of the exterior of the image forming apparatus illustrated in FIG. 1.

FIG. 2 is a front view of the exterior of the image forming apparatus 60.

As illustrated in FIG. 2, the image forming apparatus 60 includes a pair of front doors 61*a* and 61*b* each serving as a door to open and close an opening 60*a* of the body of the image forming apparatus 60. The front door 61*a* on the right side in FIG. 2 is rotatably attached to the right end of the body of the image forming apparatus 60 in FIG. 2 by a hinge. The front door 61*b* on the left side in FIG. 2 is rotatably attached to the left end of the body of the image forming apparatus 60 in FIG. 2 by a hinge. The front doors 61*a* and 61*b* form double doors to open and close the opening 60*a* of the body of the image forming apparatus 60.

Figure 3:
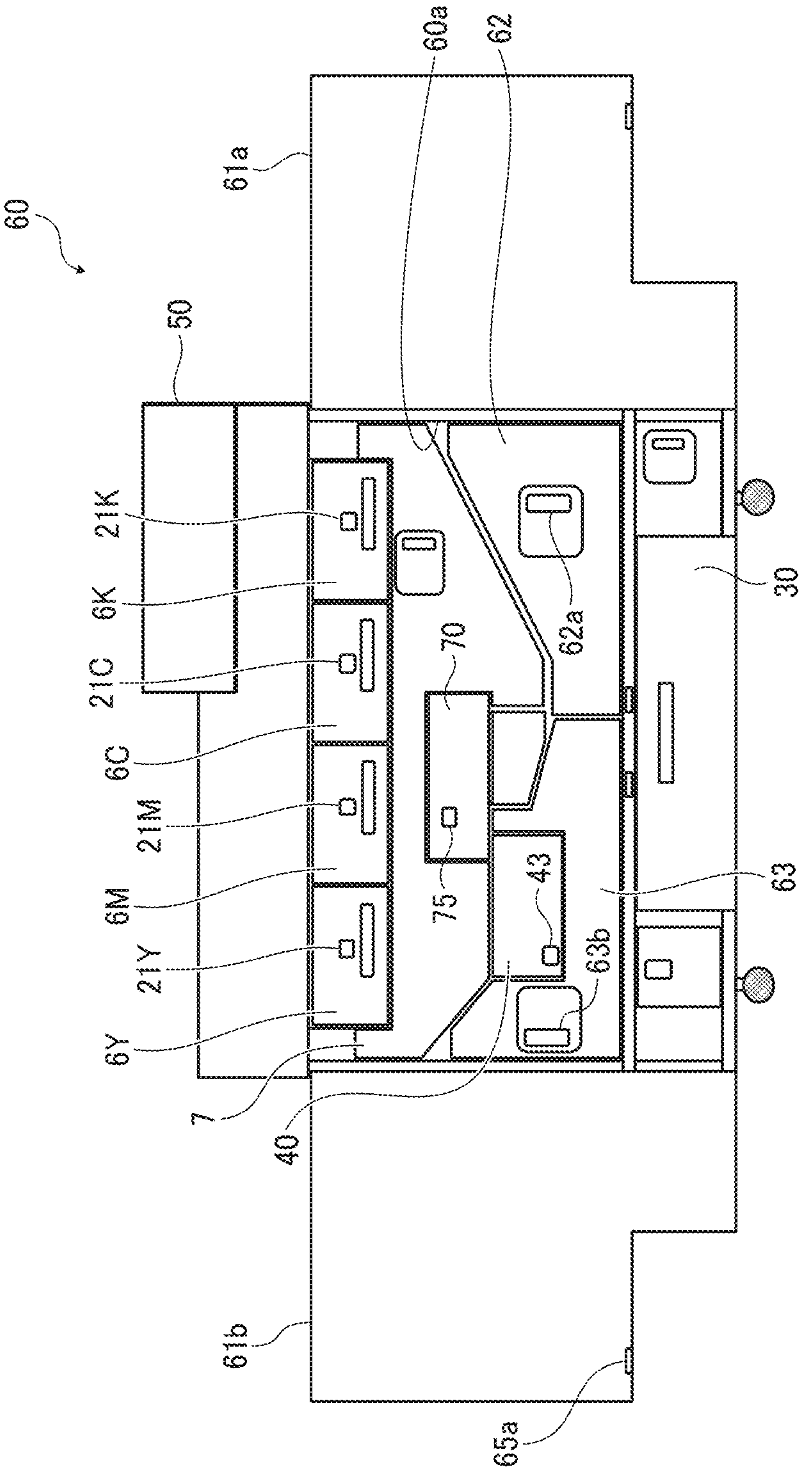
FIG. 3 is a front view of the exterior of the image forming apparatus with a pair of front doors opened.

FIG. 3 is a front view of the exterior of the image forming apparatus 60 opening the pair of front doors 61*a* and 61*b*.

As illustrated in FIG. 3, opening the pair of front doors 61*a* and 61*b* exposes the process units 6Y, 6M, 6C, and 6K, the intermediate transfer unit 7, the fixing device 40, a sheet conveyance section 62, and a sheet ejection section 63. The sheet conveyance section 62 conveys the sheet P sent from the sheet feeder 30 toward the secondary transfer roller 18. The sheet ejection section 63 conveys the sheet P having passed through the fixing device 40 and ejects the sheet P to the outside of the image forming apparatus 60.

The process units 6Y, 6M, 6C, and 6K include lock mechanisms 21Y, 21M, 21C, and 21K, respectively. Opening a lock of the lock mechanism on the process unit enables a service person in front of the image forming apparatus to attach the process unit to the image forming apparatus and detach the process unit from the image forming apparatus. Each of the process units 6Y, 6M, 6C, and 6K may be configured to be capable of being pulled out from the body of the image forming apparatus 60 to replace components of the process units such as the photoconductors 1Y, 1M, 1C, and 1K, the charging devices 2Y, 2M, 2C, and 2K, the developing devices 5Y, 5C, 5M, and 5K, and drum cleaners 4Y, 4M, 4C, and 4K.

The fixing device 40 also includes a lock mechanism 43 to lock the fixing device 40 to the body of the image forming apparatus 60. Opening the lock mechanism 43 enables an operator in front of the image forming apparatus 60 to attach the fixing device 40 to the image forming apparatus 60 and detach the fixing device 40 from the image forming apparatus 60. The fixing device 40 may be mounted on the sheet ejection section 63. In this case, the fixing device 40 is attached to and detached from the image forming apparatus 60 by pulling out the sheet ejection section 63 from the body of the image forming apparatus 60 and lifting the fixing device 40.

The sheet conveyance section 62 and the sheet ejection section 63 are disposed so as to be pulled out from the body of the image forming apparatus 60. When a sheet jam occurs in the sheet conveyance section 62 and the sheet ejection section 63, unlocking lock mechanisms 62*a* and 63*b* from the body of the image forming apparatus 60 enables pulling out the sheet conveyance section 62 and the sheet ejection section 63 from the body of the image forming apparatus 60 and removing the jammed sheet.

The intermediate transfer unit 7 includes a small transfer door 70 as an opening-and-closing member.

Figure 4A:
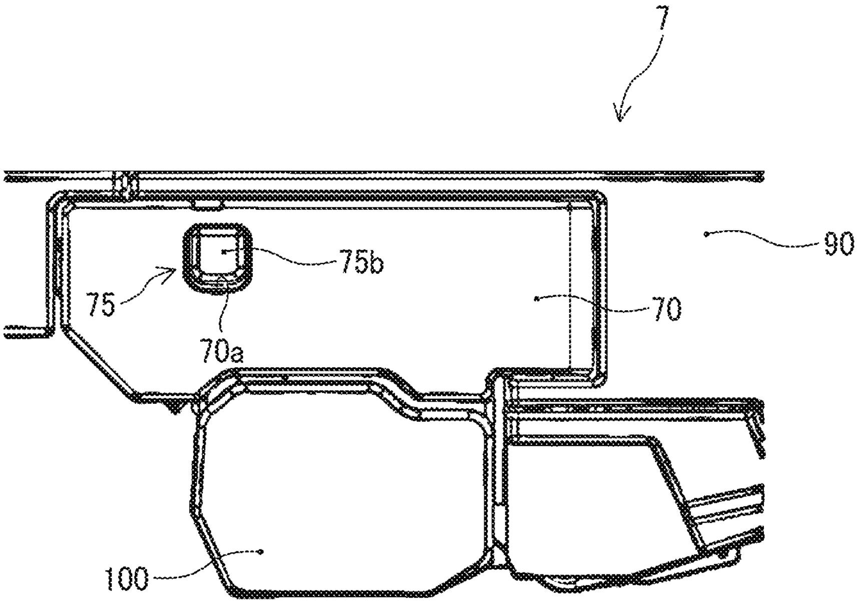
FIG. 4A is an enlarged front view of a small transfer door that is closed and the periphery of the small transfer door.
Figure 4B:
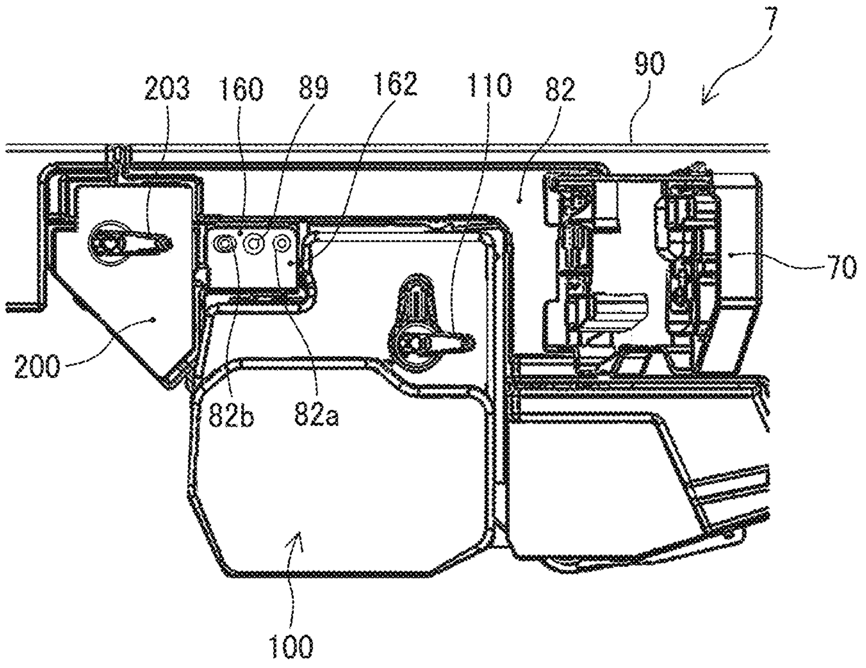
FIG. 4B is an enlarged front view of the small transfer door that is opened and the periphery of the small transfer door.

FIG. 4A is an enlarged front view of the periphery of the small transfer door 70 that is closed, and FIG. 4B is an enlarged front view of the periphery of the small transfer door 70 that is opened.

The small transfer door 70 includes a lock 75 to lock the small transfer door 70 at a closed position illustrated in FIG. 4A. The lock 75 is attached to the small transfer door 70 to be movable within a specified range in the vertical direction and is biased vertically upward by a biasing member such as a spring. The lock 75 has an operation portion 75*b* recessed inward for an operator to operate the lock 75. The small transfer door 70 has an opening 70*a*. The operation portion 75*b* is exposed from the opening 70*a*.

When the operator opens the small transfer door 70, the operator inserts his or her finger into the operation portion 75*b* of the lock 75 through the opening 70*a* of the small transfer door 70 and pushes the lock 75 downward against a biasing force of the spring. As a result, the lock 75 moves downward, and the lock is released. Thus, the small transfer door 70 is movable to an opened position as illustrated in FIG. 4B.

Opening the small transfer door 70 exposes the upper portion of the belt cleaner 100, the lubrication device 200, and a tension roller assembly 160 that supports the tension roller 16, which have been covered by the small transfer door 70. As illustrated in FIGS. 4A and 4B, the intermediate transfer unit 7 includes a front frame 82 and an inner cover 90 as a cover that covers the front frame 82.

The intermediate transfer unit 7 includes a cleaning lock lever 110 for locking the belt cleaner 100 to the intermediate transfer unit 7. Rotating the cleaning lock lever 110 counterclockwise by 90° from the state illustrated in FIG. 4B releases the lock of the belt cleaner 100 and enables the belt cleaner 100 to be taken out from the intermediate transfer unit 7.

In addition, rotating the cleaning lock lever 110 counterclockwise by 90° from the state illustrated in FIG. 4B separates the cleaning backup rollers 13, 14, and 15 from the corresponding cleaning brush rollers and separates the intermediate transfer belt 8 from the three cleaning brush rollers of the belt cleaner 100. As a result, the belt cleaner 100 can be removed from the intermediate transfer unit 7 without damaging the surface of the intermediate transfer belt 8.

The lubrication device 200 includes a lubrication lock lever 203 for locking the lubrication device 200 to the intermediate transfer unit 7. Rotating the lubrication lock lever 203 counterclockwise by 90° from the state illustrated in FIG. 4B releases the lock of the lubrication device 200 and enables the lubrication device 200 to be taken out from the intermediate transfer unit 7.

The tension roller assembly 160 is positioned by positioning pins 82*a* and 82*b* disposed on the front frame 82 of the intermediate transfer unit 7 and is fixed to the intermediate transfer unit 7 by a screw 89.

Figure 5:
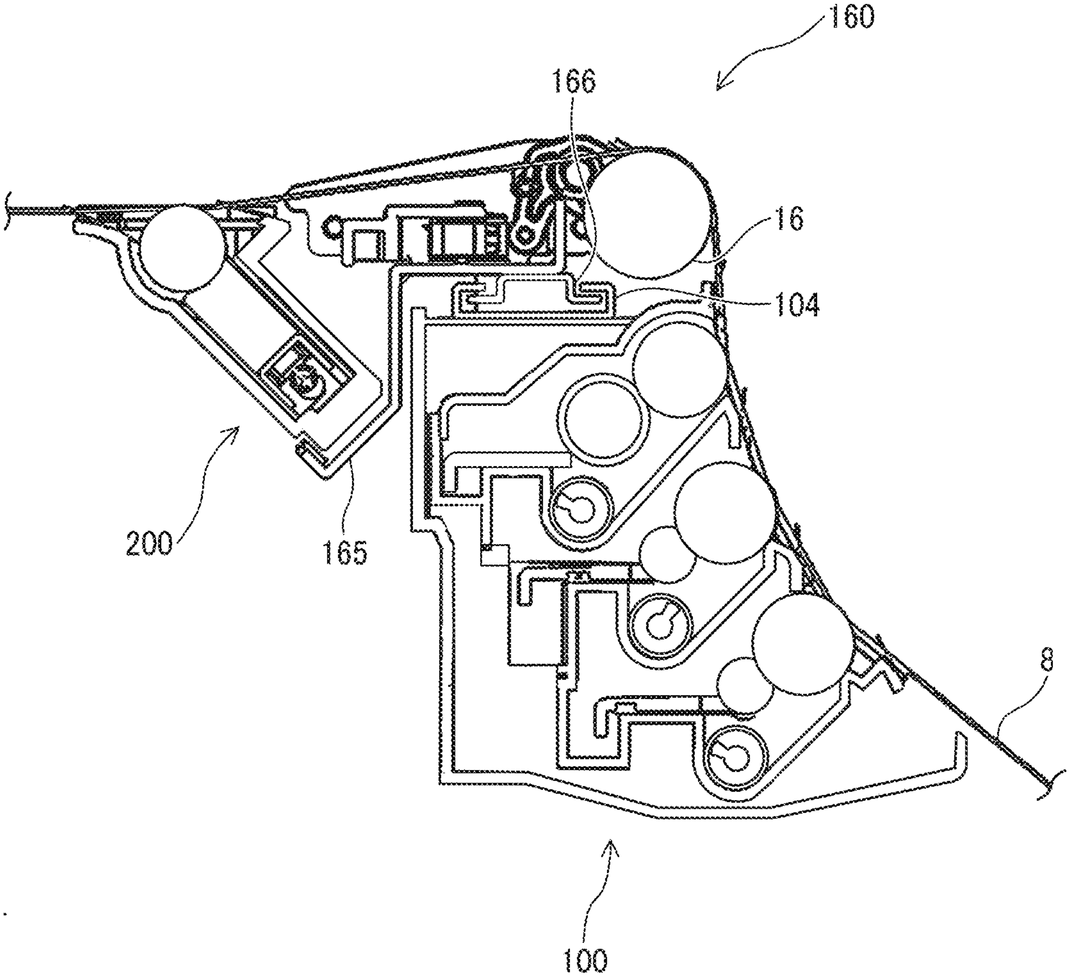
FIG. 5 is a schematic diagram illustrating configurations of a belt cleaner, a lubrication device, and a tension roller assembly.

FIG. 5 is a schematic diagram illustrating configurations of the belt cleaner 100, the lubrication device 200, and the tension roller assembly 160.

As illustrated in FIG. 5, the tension roller assembly 160 includes a first guide 165 that guides the movement (movement in the front-back direction of the image forming apparatus) of the lubrication device 200 as a detachable unit when the lubrication device 200 is attached to the intermediate transfer unit 7. In addition, the tension roller assembly 160 includes a second guide 166 that guides the movement (movement in the front-back direction of the image forming apparatus) of the belt cleaner 100 as the detachable unit when the belt cleaner 100 is attached to the intermediate transfer unit 7. The second guide 166 is engaged with a pair of guide grooves 104 provided on the upper face of the case of the belt cleaner 100 to guide the belt cleaner 100 in an attachment-and-detachment direction in which the belt cleaner 100 is attached to and detached from the intermediate transfer unit 7.

The above-described first guide 165 on the tension roller assembly 160 allows for easy attachment and detachment of the lubrication device 200 from the intermediate transfer unit 7. In addition, the second guide 166 on the tension roller assembly 160 allows for easy attachment and detachment of the belt cleaner 100 from the intermediate transfer unit 7.

Figure 6:
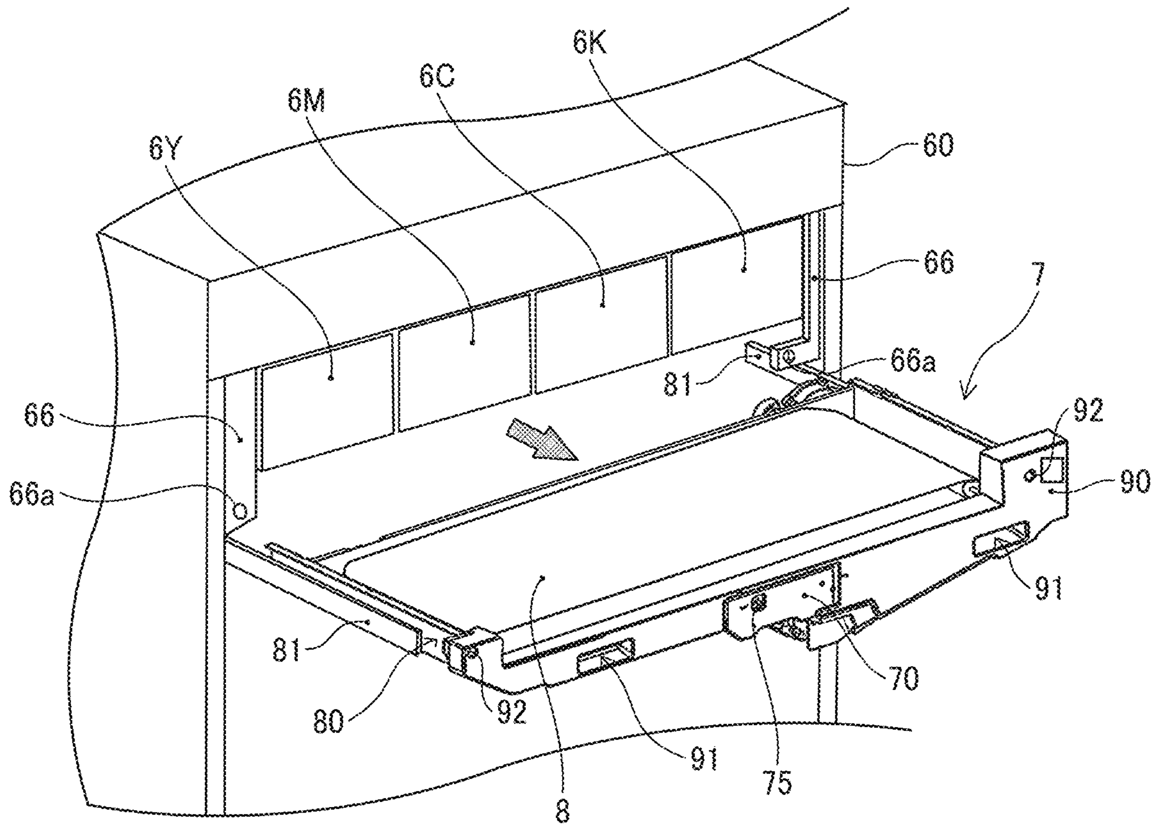
FIG. 6 is a perspective view of an intermediate transfer unit that is being pulled out from the body of the image forming apparatus.
Figure 7:
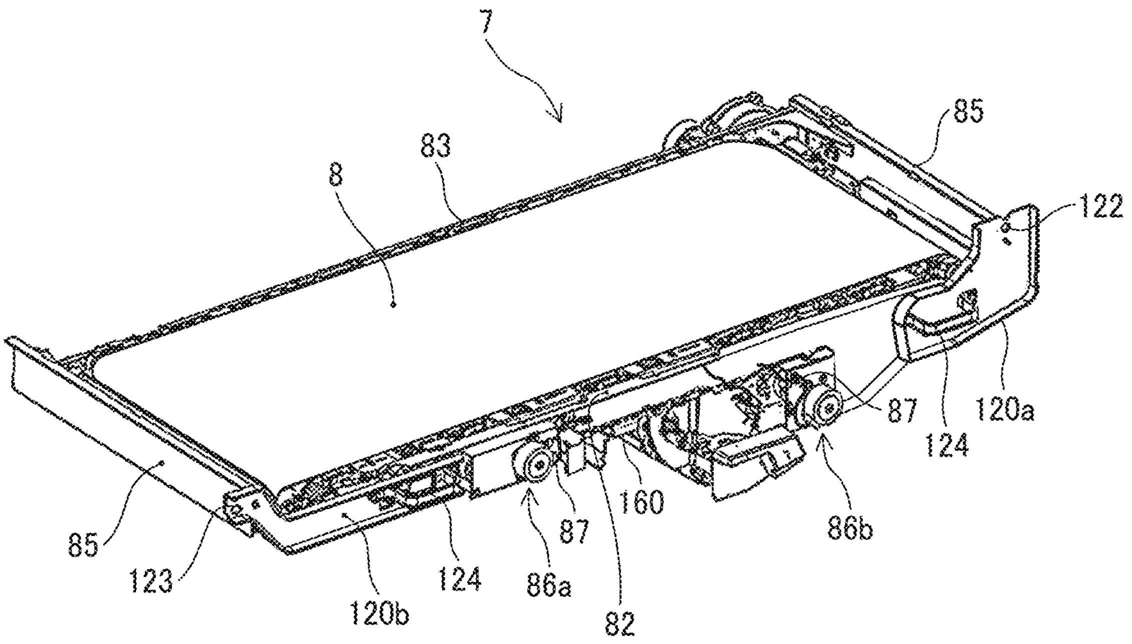
FIG. 7 is a schematic perspective view of the intermediate transfer unit with an inner cover removed.

FIG. 6 is a perspective view of the intermediate transfer unit 7 that is being pulled out from the body of the image forming apparatus. FIG. 7 is a schematic perspective view of the intermediate transfer unit 7 from which an inner cover 90 as a cover is removed.

The intermediate transfer unit 7 includes a frame housing 80 as a housing to support multiple stretching rollers disposed inside the loop of the intermediate transfer belt 8, the tension roller assembly 160, the belt cleaner 100, and the lubrication device 200.

The frame housing 80 is supported by slide rails 81 disposed in the body of the image forming apparatus to be slidable in the front-back direction of the image forming apparatus.

As illustrated in FIG. 7, the frame housing 80 includes the front frame 82 and a rear frame 83. Each of the front frame 82 and the rear frame 83 is made of sheet metal and extends in a direction orthogonal to the front-back direction of the image forming apparatus that is a direction in which the intermediate transfer unit 7 is pulled out and a rotational axis direction of the tension roller. Lateral frames 85 are disposed at both ends of the frame housing 80 in the right and left direction of the image forming apparatus.

Figure 8A:
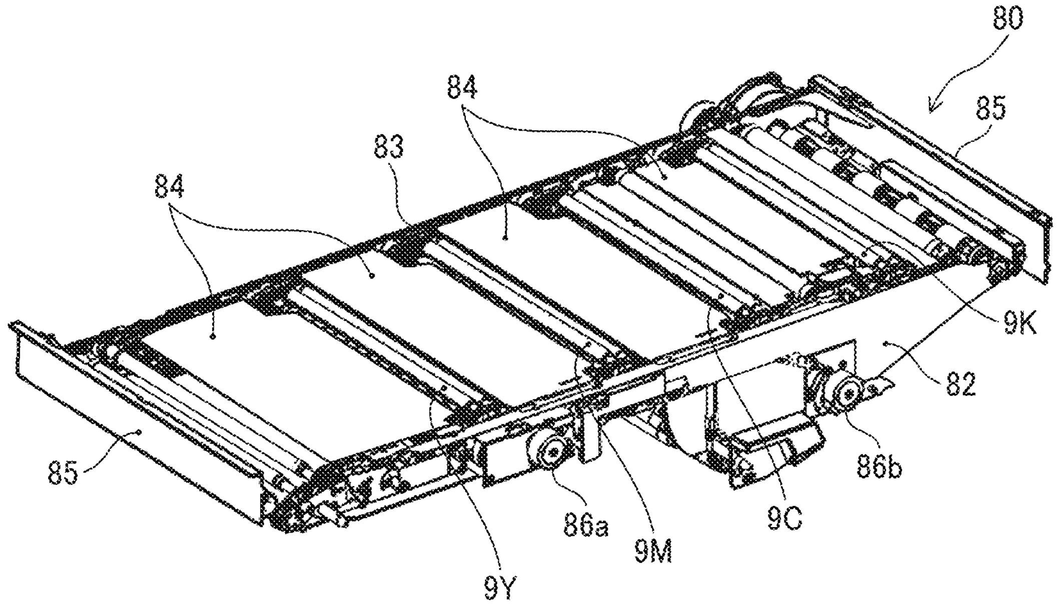
FIG. 8A is a schematic perspective view of the intermediate transfer unit from which an intermediate transfer belt is removed.
Figure 8B:
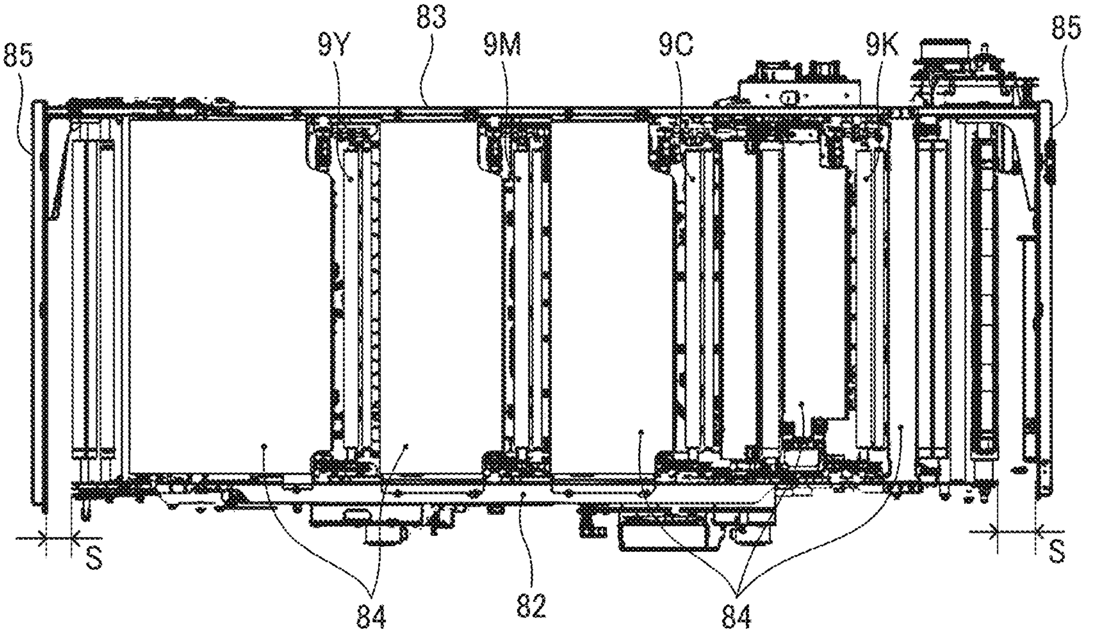
FIG. 8B is a schematic plan view of the intermediate transfer unit from which the intermediate transfer belt is removed.

FIG. 8A is a schematic perspective view of the intermediate transfer unit 7 from which an intermediate transfer belt is removed, and FIG. 8B is a schematic plan view of the intermediate transfer unit 7 from which the intermediate transfer belt is removed.

As illustrated in FIGS. 8A and 8B, the frame housing 80 includes a plurality of stays 84. One end of each of the plurality of stays 84 is fixed to the front frame 82.

As illustrated in FIG. 7, the frame housing 80 includes handles 124 as grippers, and a pair of front face plates 120*a* and 120*b* made of metal plates. One front face plate 120*a* of the two front face plates 120*a* and 120*b* is screwed to the right end of the front frame 82, and the other front face plate 120*b* is screwed to the left end of the front frame 82.

The one front face plate 120*a* has a circular positioning hole 122 serving as a main reference for positioning the intermediate transfer unit 7 with respect to the body of the image forming apparatus. The other front face plate 120*b* has a long-hole-shaped positioning hole 123, which is a long hole in the right and left direction of the image forming apparatus, serving as a sub-reference for positioning the intermediate transfer unit 7 with respect to the body of the image forming apparatus.

Screws are inserted into the positioning holes 122, 123 and screwed into screw holes 66*a* arranged in a front side plate 66 of the body of the image forming apparatus as illustrated in FIG. 6, so that the intermediate transfer unit 7 is positioned and fastened to the body of the image forming apparatus.

The intermediate transfer unit 7 is screwed to the apparatus body, so that the intermediate transfer unit 7 cannot be easily pulled out from the apparatus body. As a result, the intermediate transfer unit 7 is prevented from being pulled out during work except for a work (e.g., the maintenance work) by a service technician as a worker.

As described above, the frame housing 80 supports a large number of functional devices of the intermediate transfer unit 7, such as the plurality of stretching rollers disposed inside the loop of the intermediate transfer belt 8, the tension roller assembly 160, the belt cleaner 100, and the lubrication device 200. Supporting multiple functional devices as described above increases the load applied to the frame housing 80. However, a pair of front face plates 120*a* and 120*b* are positioned and fastened to the body fastened to the structure of the frame housing 80 and the front frame 82, so that these multiple functional devices can be firmly supported without being deformed even when the load applied to the frame housing 80 is large.

A drive motor 86*a* for driving a contact-separation mechanism that causes the primary transfer rollers 9Y, 9M, and 9C of the colors Y, M, and C to contact and be separated from the photoconductors 1Y, 1M, and 1C is attached to the front frame 82. A drive motor 86*b* for driving a contact-separation mechanism that causes the primary transfer roller 9K for color K to contact and be separated from the photoconductor 1K is also attached to the front frame 82. Cables 87 for supplying electric power to the drive motors 86*a* and 86*b* are routed on the front frame 82.

As illustrated in FIG. 6, the inner cover 90, which is made of resin, as a cover that covers the front face plate 120*a*, the front face plate 120*b*, and the front frame 82 is attached to the frame housing 80.

As a result, the drive motor 86*a*, the drive motor 86*b*, and the cables 87 that are attached to the front frame 82 are covered by the inner cover 90.

As described above, when a sheet jam has occurred, a pair of front doors 61*a* and 61*b* are opened, and then the sheet conveyance section 62 and the sheet ejection section 63 are pulled out to perform jam processing. When the electric components such as the drive motor 86*a*, the drive motor 86*b*, and the cables 87 are not covered by the inner cover 90, inadvertent touching these electrical components may occur. As a result, for example, the cable 87 may come off the drive motor, or the electrical component attached to the front frame 82 may be damaged. The front face plate 120*a*, the front face plate 120*b*, and the front frame 82 are made of metal plates. If a user accidentally touches these pointed portions of the metal plates, the user may be injured.

On the other hand, as illustrated in the present embodiment, the inner cover 90 covers the front face plate 120*a*, the front face plate 120*b*, and the front frame 82, so that inadvertent touching the drive motor 86*a*, the drive motor 86*b*, and the cables 87 held by the front frame 82 of a user can be prevented. Further, inadvertent touching a dangerous place such as a pointed portion of the front face plate 120*a*, the front face plate 120*b*, and the front frame 82 of a user can be prevented. Further, the front face plate 120*a*, the front face plate 120*b*, and the front frame 82 are covered with the inner cover 90, so that the appearance when the front doors 61*a* and 61*b* are opened can be enhanced.

As illustrated in FIG. 6, screw guide holes 92 that guide the screws for screwing the intermediate transfer unit 7 to the body of the image forming apparatus are arranged at both ends of the inner cover 90 in the right and left direction. The screw guide holes 92 are provided so as to communicate with the positioning holes 122 and 123 of the front face plates 120*a* and 120*b*, respectively. When the intermediate transfer unit 7 is pulled out from the body of the image forming apparatus, a screwdriver is inserted into the screw guide hole 92 to access the screw screwed into the screw hole 66*a* of the front side plate 66, and the screw is removed from the screw hole 66*a*. At this time, the screw may be detached from the screwdriver and fall. However, even if the screw falls from the screwdriver, the screw can be received by the screw guide hole 92 and can be prevented from falling into the body of the image forming apparatus. In other words, the screw guide hole 92 functions as a fall prevention portion.

The inner cover 90 is made of resin and has low rigidity. Accordingly, the handle disposed on the inner cover 90 to pull out the intermediate transfer unit 7 has the following disadvantage. As described above, the intermediate transfer unit 7 includes multiple functional devices of the intermediate transfer unit 7, such as the tension roller assembly 160, the belt cleaner 100, and the lubrication device 200 and is heavy in weight. Accordingly, gripping the handle disposed on the inner cover 90 and pulling out the intermediate transfer unit 7 having a heavy weight may deform the inner cover 90.

In contrast, as in the present embodiment, the handles disposed on the front face plates 120*a* and 120*b* of the frame housing 80 made of a metal plate and having high rigidity as illustrated in FIG. 7 enables the intermediate transfer unit 7 to be pulled out without deformation of the front face plates 120*a* and 120*b*. The frame housing 80 is reinforced by the plurality of stays 84 (see FIGS. 8A and 8B) in the front-back direction of the image forming apparatus as described above. Accordingly, pulling out the intermediate transfer unit 7 does not deform the frame housing 80. The handle may be disposed on the front frame 82 of the frame housing 80.

Since the inner cover 90 covers the front frame 82, the front face plate 120*a*, and the front face plate 120*b* of the frame housing 80, the handles 124 on the front face plates 120*a* and 120*b* are also covered. For a service person as an operator to access the handles 124 on the front face plates 120*a* and 120*b*, the inner cover 90 in the present embodiment has concave portions 91 as illustrated in FIG. 6. The concave portion 91 of the inner cover 90 is positioned directly below the handle 124, and a hole is formed on the upper face of the concave portion 91 to allow the serviceperson as the operator to access the handle 124.

To pull out the intermediate transfer unit 7 from the body of the image forming apparatus, the serviceperson inserts his or her finger into the hole of the concave portion 91 to access the handle 124. In this manner, the serviceperson can grip the handles 124 disposed on the front face plates 120*a* and 120*b* and pull out the intermediate transfer unit 7 from the body of the image forming apparatus without removing the inner cover 90. Accordingly, the operation of pulling out the intermediate transfer unit 7 can be simplified as compared with the case where the inner cover 90 is removed to pull out the intermediate transfer unit 7.

The following describes the tension roller assembly 160 according to the present embodiment.

Figure 9:
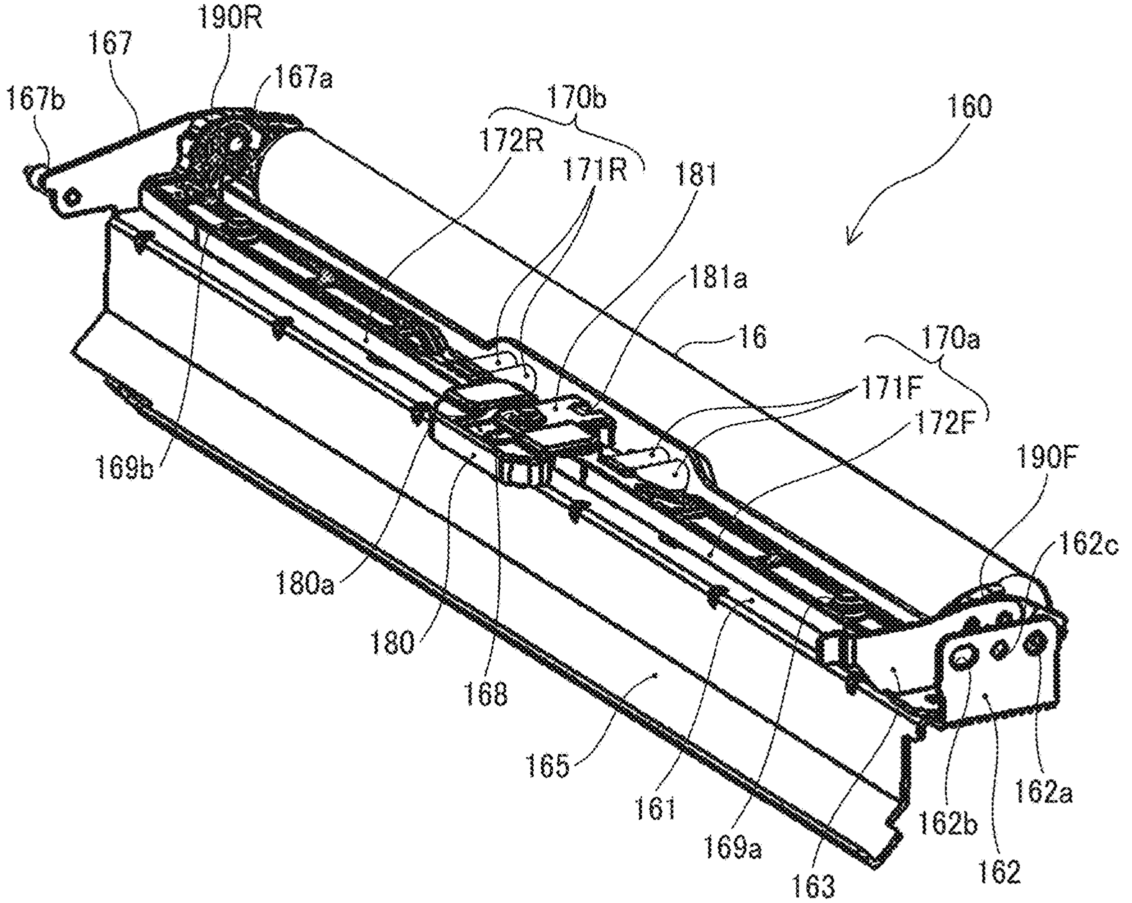
FIG. 9 is a schematic perspective view of the tension roller assembly of FIG. 5.
Figure 10:
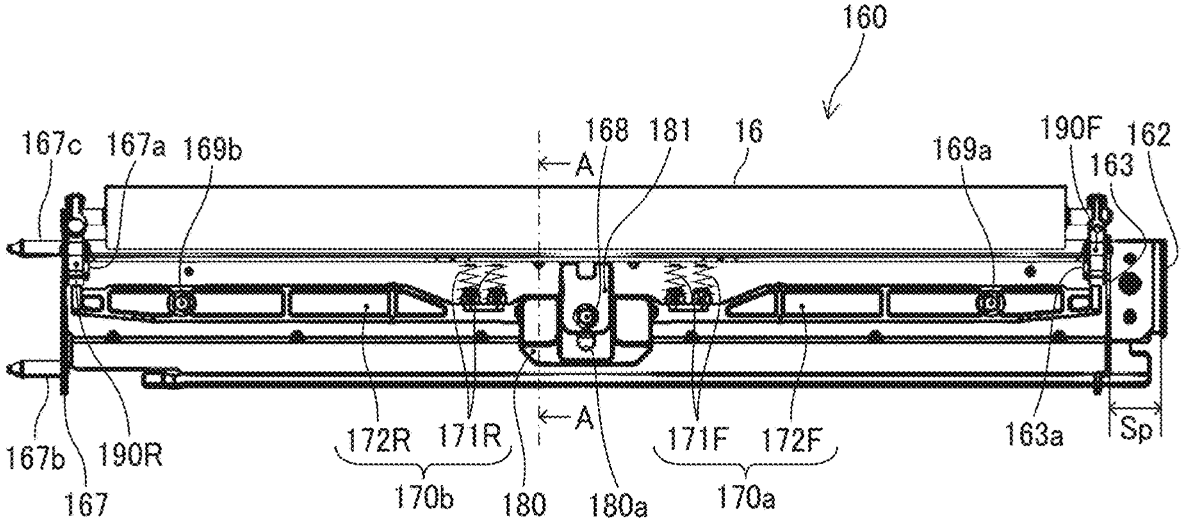
FIG. 10 is a schematic plan view of a tension roller assembly.
Figure 11:
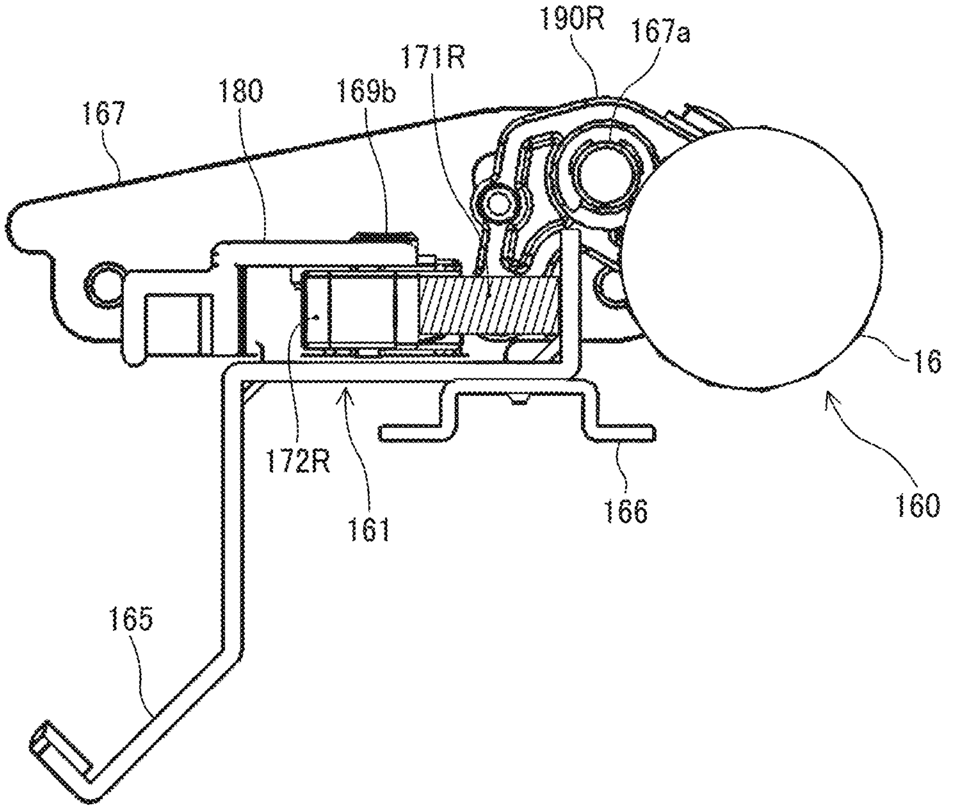
FIG. 11 is a cross-sectional view taken along a line A-A in FIG. 10.

FIG. 9 is a schematic perspective view of the tension roller assembly 160. FIG. 10 is a schematic plan view of the tension roller assembly 160. FIG. 11 is a cross-sectional view taken along line A-A in FIG. 10.

The tension roller assembly 160 includes a pair of roller holders 190F and 190R rotatably supporting the tension roller 16 and a base 161 swingably holding the roller holders 190F and 190R. The pair of roller holders 190F and 190R includes a front roller holder 190F as a first roller holder and a rear roller holder 190R as a second roller holder. The tension roller assembly 160 includes a first presser 170*a* that presses the front roller holder 190F to press the front end of the tension roller 16 against the intermediate transfer belt 8. In addition, the tension roller assembly 160 includes a second presser 170*b* that presses the rear roller holder 190R to press the rear end of the tension roller 16 against the intermediate transfer belt 8. The first presser 170*a* includes front coil springs 171F as first elastic bodies and a front pressing arm 172F as a first pressing arm pressing the front roller holder 190F. The second presser 170*b* includes rear coil springs 171R as second elastic bodies and a rear pressing arm 172R as a second pressing arm pressing the rear roller holder 190R. Instead of the front and rear coil springs 171F and 171R, elastic bodies such as flat springs and rubber products may be used as the first elastic body and the second elastic body.

The front pressing arm 172F of the first presser 170*a* and the rear pressing arm 172R of the second presser 170*b* are aligned on the base 161 in the front-back direction of the image forming apparatus that is also the axial direction of the tension roller. Each of the front pressing arm 172F and the rear pressing arm 172R is held by the base 161 so as to be swingable in the right and left direction of the image forming apparatus about each of pivot shafts 169*a* and 169*b* disposed on the base 161. The front pressing arm 172F has one end and the other end in the front-back direction that is also the axial direction of the tension roller, and the other end is closer to the center of the tension roller assembly than the one end in the axial direction. Two front coil springs 171F press the other end of the front pressing arm 172F so as to be away from the tension roller 16. Similarly, the rear pressing arm 172R has one end and the other end in the axial direction of the tension roller, and the other end is closer to the center of the tension roller assembly than the one end in the axial direction. Two rear coil springs 171R press the other end of the rear pressing arm 172R so as to be away from the tension roller 16.

The tension roller assembly 160 includes a pressure release lever 180 as a pressure releaser that releases the pressure of the pair of pressers that is the first presser 170*a* and the second presser 170*b*. The pressure release lever 180 is held by the base 161 so as to be slidable in a predetermined range in the right and left direction of the image forming apparatus. Specifically, the pressure release lever 180 has a through-hole 180*a* at the center of the pressure release lever 180 in the front-back direction of the image forming apparatus. The through-hole 180*a* extends in the right and left direction of the image forming apparatus. A shaft 168 on the base 161 penetrates through the through-hole 180*a*. As a result, the pressure release lever 180 is held to be slidable in the predetermined range in the left-right direction of the image forming apparatus. A stopper 181 retains the pressure release lever 180 so as not to detach from the shaft 168.

Figure 12:
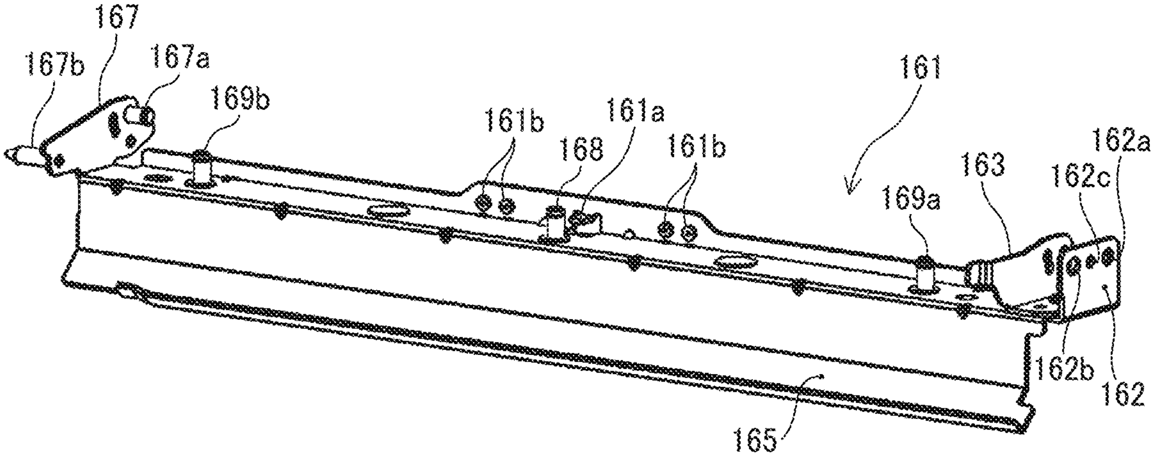
FIG. 12 is a schematic perspective view of a base.

The stopper 181 has a face bent downward by 90° so as to face the tension roller, and the face has an engagement groove 181*a* at the center of the face in the front-back direction of the image forming apparatus. An engagement projection 161*a* is disposed on the base 161 as illustrated in FIG. 12. The engagement projection 161*a* is fitted into the engagement groove 181*a*, and the stopper 181 is fitted to the shaft 168. As a result, the stopper 181 is attached to the base 161 so that the pressure release lever 180 is not detached from the shaft 168.

The pressure release lever 180 pushes the other end of the front pressing arm 172F of the first presser 170*a* and the other end of the rear pressing arm 172R of the second presser 170*b* that are the ends adjacent to the center of the tension roller assembly in the front-back direction against biasing forces of the front coil springs 171F and the rear coil springs 171R to release the pressurization of the first presser 170*a* and the second presser 170*b*, which is described below.

As illustrated in FIG. 11, the base 161 includes a second guide 166 on a lower face of the base 161 to guide the belt cleaner 100 moving in the front-back direction of the image forming apparatus to attach to or detach from the intermediate transfer unit 7.

FIG. 12 is a schematic perspective view of the base 161.

The base 161 is made of sheet metal and has a positioning face portion 162 formed by bending a front end of the base close to the front side of the image forming apparatus upward by 90°. The positioning face portion 162 has positioning holes 162*a* and 162*b* into which the positioning pins 82*a* and 82*b* (see FIG. 4B) disposed on the front frame 82 of the intermediate transfer unit 7 are inserted.

One positioning hole 162*a* is a round hole serving as a main reference for positioning, and the other positioning hole 162*b* is a slot extending in the right and left direction of the image forming apparatus and serving as a sub-reference for positioning. The positioning face portion 162 has a screw through hole 162*c* between the positioning holes 162*a* and 162*b*. The screw 89 as a fastener (see FIG. 4B) penetrates through the screw through hole 162*c* and screws the tension roller assembly 160 to the front frame 82.

The base 161 has a first guide 165 that guides the lubrication device 200 to move in the front-back direction of the image forming apparatus and attach or detach the lubrication device 200 to or from the intermediate transfer unit 7. The first guide 165 functions as a grip for an operator to grip and detach the tension roller assembly 160 from the intermediate transfer unit 7, which is described below.

The base 161 has a holder holding plate 163 behind the positioning face portion 162 and inside the image forming apparatus to swingably hold the front roller holder 190F. A holder support shaft 163*a* is disposed on the holder holding plate 163 to swingably supports the front roller holder 190F (see FIG. 10).

The holder holding plate 163 and the positioning face portion 162 are spaced apart from each other by a predetermined distance Sp (see FIG. 10) in the front-back direction of the image forming apparatus. The above-described structure forms a predetermined gap between the holder holding plate 163 and the front frame 82 after the tension roller assembly 160 is attached to the intermediate transfer unit 7. The tension roller assembly 160 can move in the front-back direction by the predetermined gap. When the tension roller assembly 160 is detached from the intermediate transfer unit 7, the tension roller assembly 160 can be pulled in the front-back direction of the image forming apparatus to pull out the positioning pins 82*a* and 82*b* from the positioning holes 162*a* and 162*b*.

The base 161 has a holder holding face portion 167 formed by bending a back end of the base close to the back side of the image forming apparatus upward by 90°, and the holder holding face portion 167 swingably holds the rear roller holder 190R. A holder support shaft 167*a* is disposed on the holder holding face portion 167 to swingably support the rear roller holder 190R.

Two positioning pins 167*b* and 167*c* (see FIG. 10) are disposed on a face (that is an outer face) of the holder holding face portion 167 opposite to the face on which the holder support shaft 167*a* is disposed. Inserting the positioning pins 167*b* and 167*c* into positioning holes in the frame housing of the intermediate transfer unit positions the rear side of the tension roller assembly 160. The length of each of the positioning pins 167*b* and 167*c* is designed such that moving the tension roller assembly 160 forward causes the positioning pins 167*b* and 167*c* to be pulled out from the positioning holes as described above.

In addition, the shaft 168 is disposed at the center of the base 161 in the front-back direction of the image forming apparatus to slidably hold the pressure release lever 180 in the right and left direction of the image forming apparatus. A pair of pivot shafts 169*a* and 169*b* are disposed on the base 161 to swingably support the front pressing arm 172F of the first presser 170*a* and the rear pressing arm 172R of the second presser 170*b*.

One end of the base 161 facing the tension roller is bent upward by 90°. The engagement projection 161*a* and spring detents 161*b* are on the one end bent upward by 90°. The engagement projection 161*a* engages with the engagement groove 181*a* of the stopper 181, and spring detents 161*b* support ends of coil springs of the first presser 170*a* and the second presser 170*b*.

Figure 13:
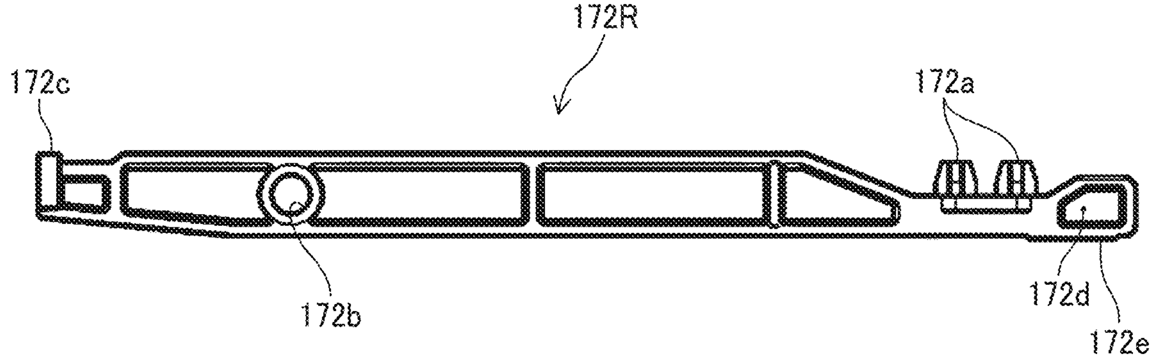
FIG. 13 is a schematic plan view of a pressing arm of a second presser.

FIG. 13 is a schematic plan view of the rear pressing arm 172R of the second presser 170*b*.

As illustrated in FIG. 13, the rear pressing arm 172R has one end and the other end in the lateral direction in FIG. 13, and the other end is closer to the center of the tension roller assembly than the one end in the front-back direction. The rear pressing arm 172R has an engaging concave portion 172*d* at the other end. A detachment preventing projection 180*b* of the pressure release lever 180 (see FIG. 14A) engages with the engaging concave portion 172*d*. The rear pressing arm 172R has a contacted face 172*e* at the other end of the rear pressing arm 172R. A contact projection 180*c* (see FIG. 14A) of the pressure release lever 180 is brought into contact with the contacted face 172*e*.

The rear pressing arm 172R has a pressing portion 172*c* at the one end of the rear pressing arm 172R. The pressing portion 172*c* abuts against a pressed portion 190*c* of the rear roller holder 190R (see FIG. 17) to press the rear roller holder 190R. The rear pressing arm 172R has two spring holding projections 172*a* adjacent to the engaging concave portion 172*d*. One end of the coil spring 171R is attached to the spring detent 161*b*, and the other end of the coil spring 171R is attached to the spring holding projection 172*a*. The rear pressing arm 172R has a holding hole 172*b* into which the pivot shaft 169*b* (see FIG. 9) is inserted. Inserting the pivot shaft 169*b* into the holding hole 172*b* swingably holds the rear pressing arm 172R on the base 161. The front pressing arm 172F of the first presser 170*a* has a configuration in which the rear pressing arm 172R in FIG. 13 is laterally reversed.

Figure 14A:
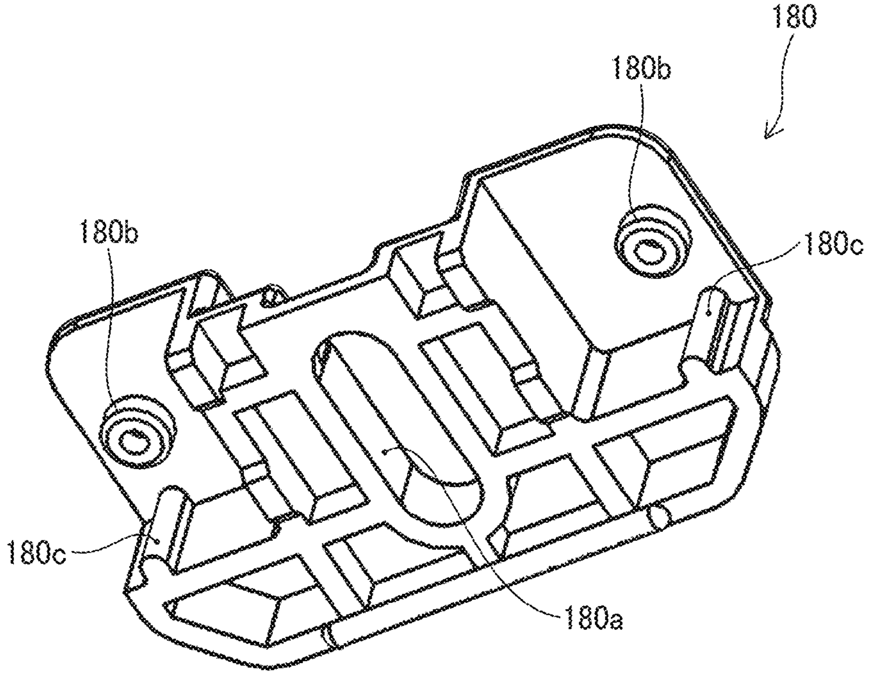
FIG. 14A is a schematic perspective view of a pressure release lever including a bottom face.
Figure 14B:
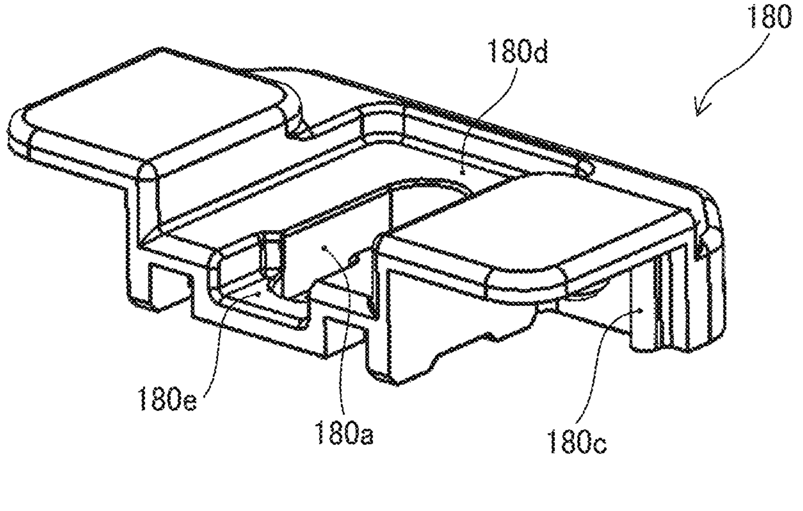
FIG. 14B is a schematic perspective view of the pressure release lever including a top face.
Figure 15:
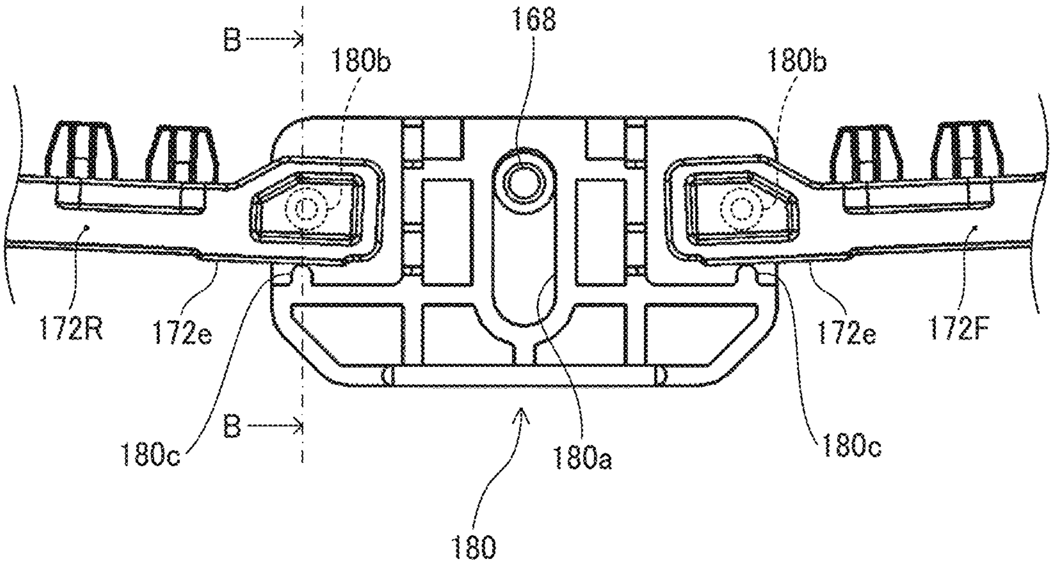
FIG. 15 is a schematic bottom view of the pressure release lever and parts of pressing arms.
Figure 16:
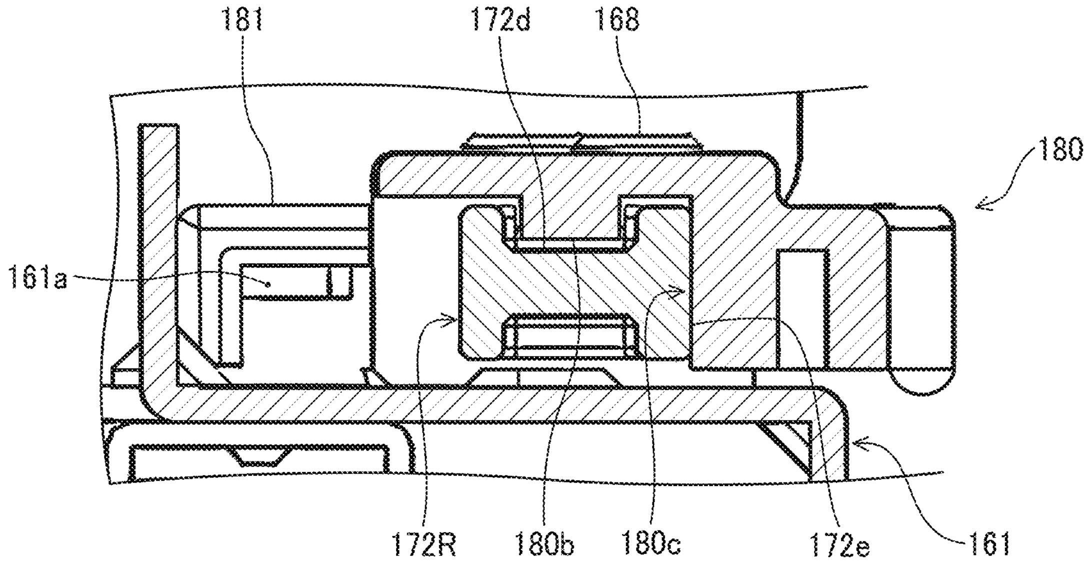
FIG. 16 is a cross-sectional view taken along a line B-B in FIG. 15.

FIG. 14A is a schematic perspective view of the pressure release lever 180 as viewed from below, and FIG. 14B is a schematic perspective view of the pressure release lever 180 as viewed from above. FIG. 15 is a schematic bottom view of the pressure release lever 180 and parts of the pressing arms 172F and 172R. FIG. 16 is a cross-sectional view taken along line B-B in FIG. 15.

The pressure release lever 180 has the through-hole 180*a* at the center of the pressure release lever 180 in the front-back direction of the image forming apparatus, and the through-hole 180*a* extends in the right and left direction of the image forming apparatus. As illustrated in FIG. 15, the shaft 168 of the base 161 penetrates the through-hole 180*a* to hold the pressure release lever 180 so that the pressure release lever can slide in a predetermined range in the right and left direction of the image forming apparatus.

As illustrated in FIG. 14B, an upper part of the pressure release lever 180 has a stepped portion 180*d* lower than the other part of the upper part of the pressure release lever 180, and the stepped portion 180*d* is around the through-hole 180*a* through which the shaft 168 penetrates. The stopper 181 (see FIG. 9) engages with the stepped portion 180*d*, and the stopper 181 also functions as a guide that guides the pressure release lever 180 sliding in the right and left direction of the image forming apparatus.

As illustrated in FIG. 14A, the pressure release lever 180 has a pair of detachment preventing projections 180*b* to prevent the pressure release lever 180 from detaching from each of the front pressing arm 172F and the rear pressing arm 172R. As illustrated in FIG. 16, each of the detachment preventing projections 180*b* is engaged with the engaging concave portion 172*d* provided at the other end of each of the front pressing arm 172F and the rear pressing arm 172R to prevent the pressure release lever from detaching from each of the front pressing arm 172F and the rear pressing arm 172R. As illustrated in FIG. 16, the detachment preventing projection 180*b* is not in contact with each of the front pressing arm 172F and the rear pressing arm 172R so as not to hinder the swing of each of the front pressing arm 172F and the rear pressing arm 172R.

As illustrated in FIG. 14A, the pressure release lever 180 has a pair of contact projections 180*c* that come into contact with the contacted faces 172*e* of the front pressing arm 172F and the rear pressing arm 172R. When the pressure release lever 180 releases the pressure applied to the tension roller by the first presser 170*a* and the second presser 170*b*, the contact projections 180*c* push the contacted faces 172*e* against the biasing force of the front and rear coil springs 171F and 171R, which pivots the front and rear pressing arms to release the pressure. The tip of the contact projection 180*c* has an R shape so that each of the front and rear pressing arms 172F and 172R can smoothly pivot. In other words, the pressure release lever movably presses the other end of the front pressing arm and the other end of the rear pressing arm in a direction opposite to the first pressing direction, to release the pressure applied to the tension roller by the first presser and the second presser.

The contact projection 180*c* may be eliminated, and the detachment preventing projection 180*b* may push the other end of the pressing arm to release the pressure. However, the configuration including the contact projection 180*c* is preferable. The coil springs 171F or 171R apply biasing forces to one face of the pressing arm on which the spring holding projections 172*a* are disposed, and the contact projection 180*c* contacts the other face of the pressing arm that is opposite to the one face. In the configuration in which the contact projection 180*c* is eliminated and the detachment preventing projection 180*b* pushes the other end of the pressing arm, the biasing force of the coil spring acts as a shearing force on the detachment preventing projection 180*b*. The pressure release lever 180 is made of resin having low rigidity, and the biasing force of each of the coil springs 171F and 171R is large. As a result, the detachment preventing projection 180*b* may be deformed or damaged. In contrast, in the configuration including the contact projection 180*c* pushing the other end of the pressing arm, the biasing force of each of the coil springs 171F and 171R acts as an axial force on the contact projection 180*c*. As a result, even if the pressure release lever 180 is made of resin having low rigidity and the biasing force of the coil spring is strong, the contact projection can be prevented from being deformed or damaged.

The pressure release lever 180 has a clearance portion 180*e* as illustrated in FIG. 14B to prevent the pressure release lever 180 pushed and moved toward the coil spring from hitting the engagement projection 161*a* of the base 161 (see FIG. 12).

Figure 17:
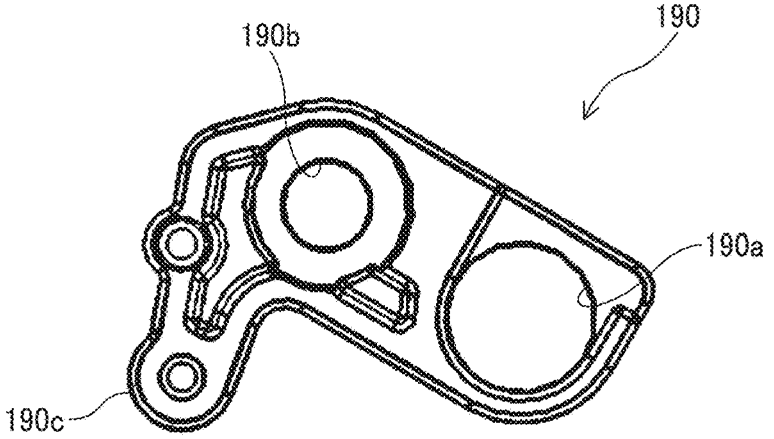
FIG. 17 is a schematic side view of a roller holder.

FIG. 17 is a schematic side view of each of the roller holders 190F and 190R. Since the roller holders 190F and 190R have the same structure, references F and R are omitted below, including FIG. 17.

The roller holder 190 has a roller support hole 190*a*, a support hole 190*b*, and a pressed portion 190*c*, A bearing is set in the roller support hole 190*a* to rotatably support the tension roller 16. The holder support shaft is inserted into the support hole 190*b* to swingably support the roller holder 190. The pressing portion of the pressing arm presses the pressed portion 190*c*.

Figure 18A:
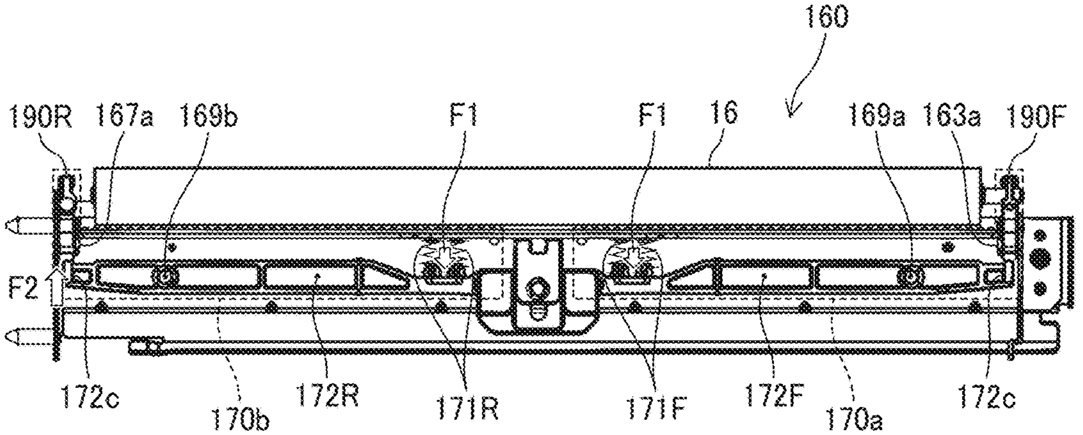
FIG. 18A is a schematic plan view of the tension roller assembly to describe how a presser presses a tension roller against an intermediate transfer belt.
Figure 18B:
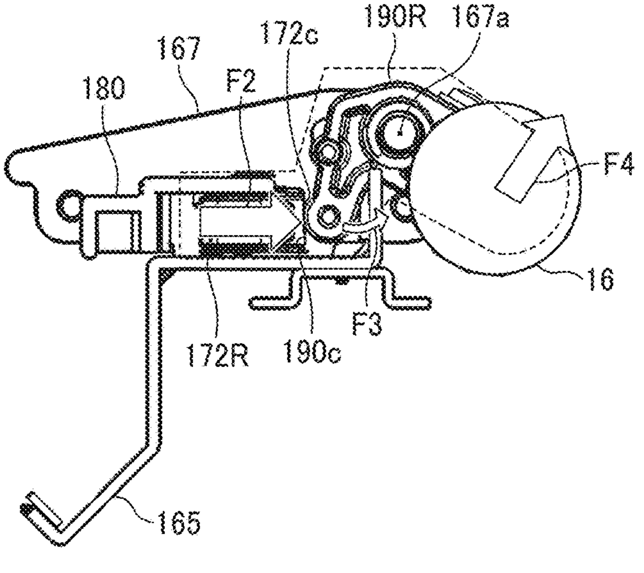
FIG. 18B is a schematic side view of the tension roller assembly to describe how the presser presses the tension roller against the intermediate transfer belt.

FIG. 18A is a plan view of the tension roller assembly 160, and FIG. 18B is a side view of the tension roller assembly 160. With reference to FIGS. 18A and 18B, the following describes how the first presser 170*a* and the second presser 170*b* press the tension roller 16 against the intermediate transfer belt 8.

As illustrated in FIG. 18A, the front and rear coil springs 171F and 171R bias ends of the front and rear pressing arms 172F and 172R in directions indicated by arrows F1 in FIG. 18A, respectively. These ends of the front and rear pressing arms 172F and 172R are closer to the center of the tension roller assembly than the other ends of the front and rear pressing arms 172F and 172R in the front-back direction. The biasing forces of the front and rear coil springs 171F and 171R cause the front and rear pressing arms 172F and 172R to pivot about the pivot shafts so that the ends of the front and rear pressing arms 172F and 172R close to the center of the tension roller assembly move downward in FIG. 18A. As a result, the pressing portions 172*c* of the front and rear pressing arms 172F and 172R press the pressed portions 190*c* of the front and rear roller holders 190F and 190R in the direction indicated by arrows F2 in FIGS. 18A and 18B. Then, each of the front and rear roller holders 190F and 190R rotates in the direction indicated by the arrow F3 in FIG. 18B with the holder support shaft as a fulcrum, and the tension roller held by the front and rear roller holders 190F and 190R moves in the direction indicated by the arrow F4 in FIG. 18B. As a result, both ends of the tension roller 16 are pressed against the intermediate transfer belt 8 and apply tension to the intermediate transfer belt 8. In other words, the first presser 170*a* includes the front pressing arm 172F as the first pressing arm pivotably pressing the front roller holder 190F as the first roller holder in the direction indicated by the arrow F2 as a first pressing direction. The second presser 170*b* includes the rear pressing arm 172R as the second pressing arm pivotably pressing the rear roller holder 190R as the second roller holder in the first pressing direction.

Figure 19:
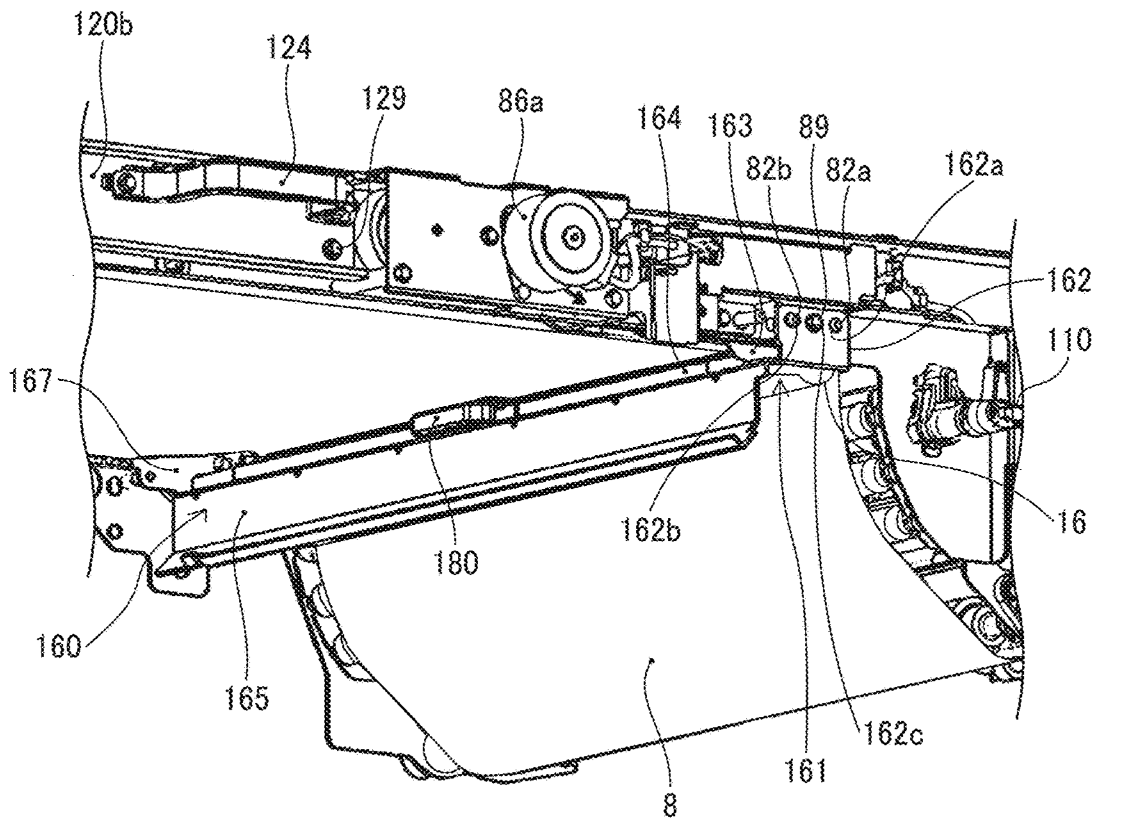
FIG. 19 is a perspective view of a tension roller assembly attached to the intermediate transfer unit as viewed from below.

When the tension roller assembly 160 is removed from the intermediate transfer unit 7, first, the belt cleaner 100 and the lubrication device 200 are removed, and the intermediate transfer unit 7 is pulled out from the body of the image forming apparatus (see FIG. 19). Subsequently, the screw 89 (see FIG. 4B) is removed to release the fastening of the tension roller assembly 160.

After the screw 89 is removed, the tension roller assembly 160 is moved to the front side, the positioning pins 82*a* and 82*b* are pulled out from the positioning holes 162*a* and 162*b*, and the positioning pins 167*b* and 167*c* (see FIG. 10) are pulled out of the positioning holes. As described above, the predetermined gap is formed between the holder holding plate 163 and the front frame 82 to allow the tension roller assembly 160 to move to the front side by the gap. The above-described configuration enables the positioning pins 82*a* and 82*b* to be pulled out from the positioning holes 162*a* and 162*b* and enables the positioning pins 167*b* and 167*c* (see FIG. 10) to be pulled out from the positioning holes.

When the tension roller 16 applies the tension to the intermediate transfer belt 8, pulling out the positioning pins from the positioning holes causes the following problem. The tension roller 16 rubs against the outer circumferential surface of the intermediate transfer belt 8 in the front-back direction of the image forming apparatus, which may damage the outer circumferential surface of the intermediate transfer belt 8. To countermeasure the above problem, before the tension roller assembly 160 is moved to the front side to pull out the positioning pins 82*a* and 82*b* from the positioning holes 162*a* and 162*b*, the pressure applied to the tension roller by the first presser 170*a* and the second presser 170*b* is released, and the tension roller 16 is separated from the intermediate transfer belt 8.

In the related art, the loop of a coil spring of a presser disposed on a front part of the tension roller assembly is removed from a hook, and the loop of another coil spring of a presser disposed on a rear part of the tension roller assembly is removed from another hook. Thus, the pressure applied to the tension roller by the pressers is released. In order to remove the coil springs from the hooks, a serviceperson needs to crawl under the intermediate transfer unit, which takes a long time and is messy work. In the present embodiment, simply pushing the pressure release lever 180 at the center of the tension roller assembly in the front-back direction with one hand can release the pressure applied to the tension roller by both the first presser 170*a* and the second presser 170*b*. The above-described work to release the pressure applied to the tension roller by the first presser 170*a* and the second presser 170*b* and separate the tension roller 16 from the intermediate transfer belt 8 is not messy and does not take much time.

With reference to the drawings, the following specifically describes how the pressure release lever 180 releases the pressure applied to the tension roller by the first presser 170*a* and the second presser 170*b*.

Figure 20:
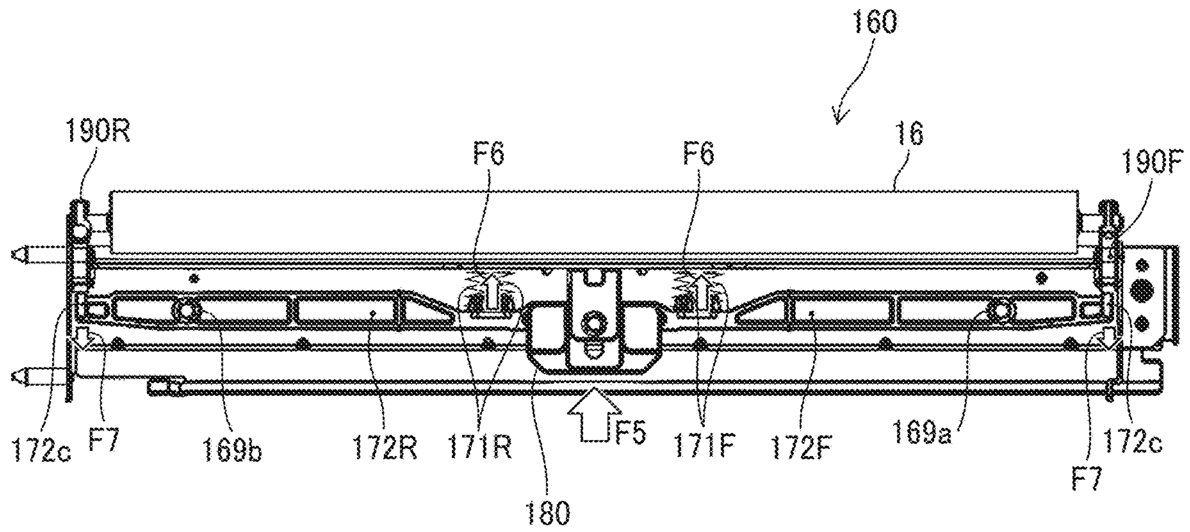
FIG. 20 is a schematic plan view of the tension roller assembly to illustrate a pressure release lever to release pressure applied to the tension roller by a first presser and a second presser.
Figure 21A:
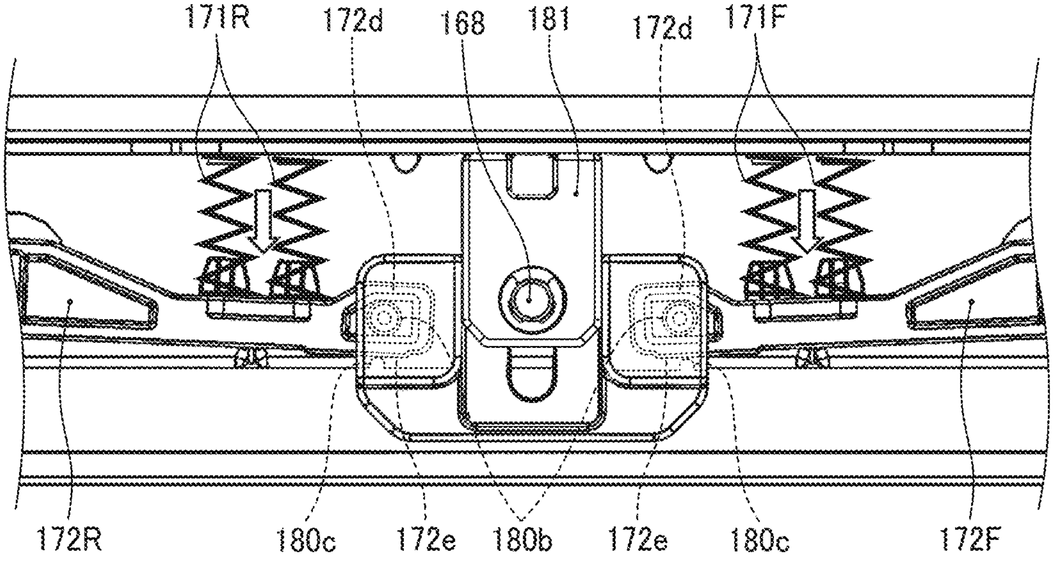
FIGS. 21A and 21B are enlarged plan views of a part around a pressure release lever.
Figure 21B:
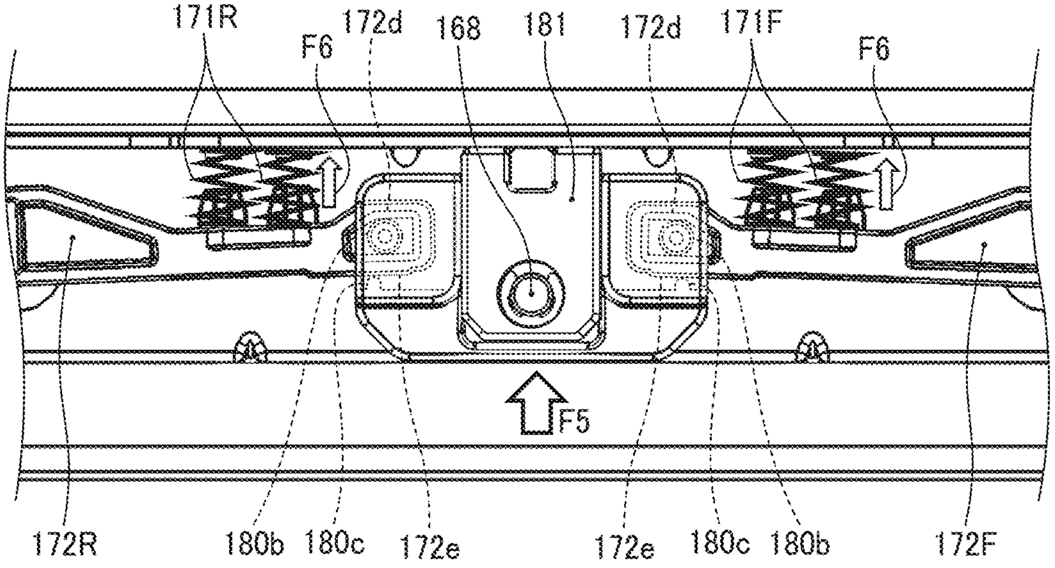
Figure 22:
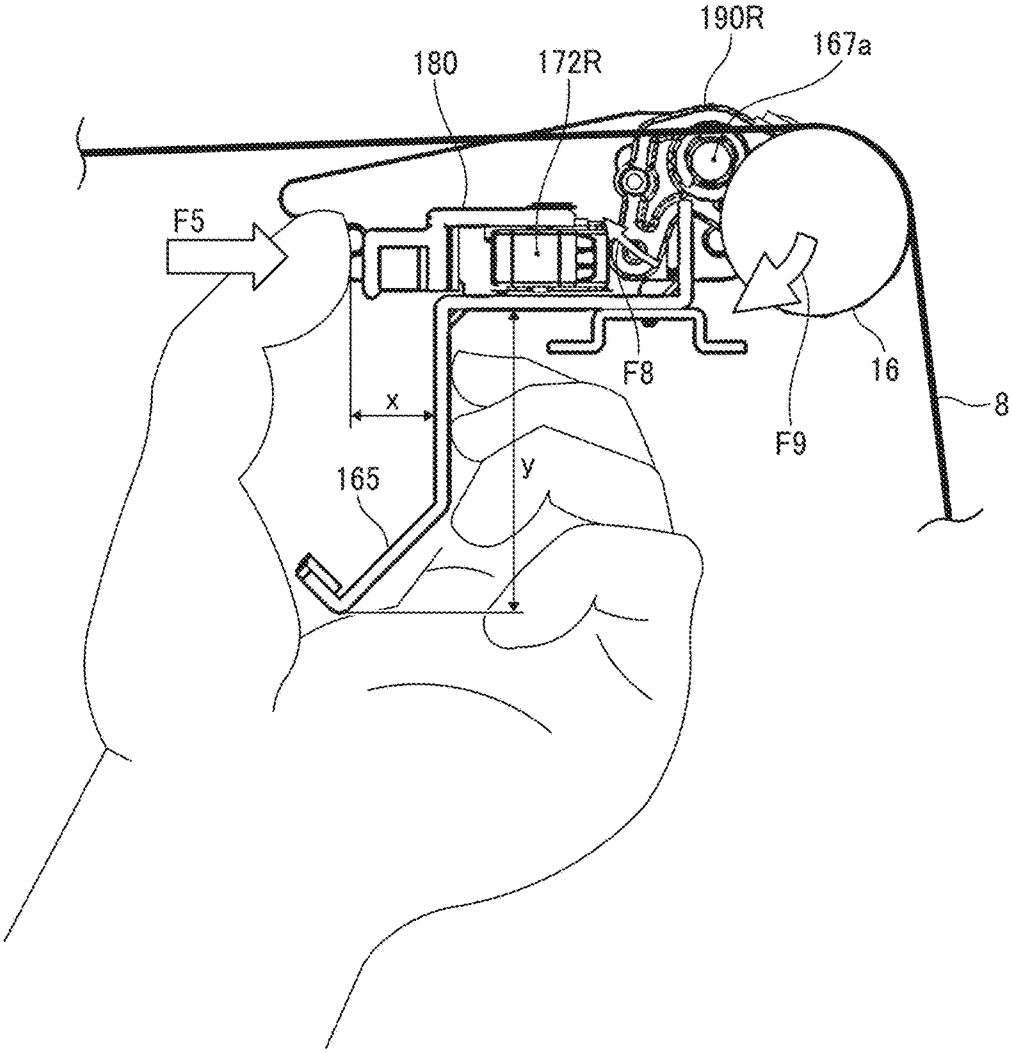
FIG. 22 is a diagram illustrating an example of the operation of the pressure release lever.

FIG. 20 is a schematic plan view of the tension roller assembly 160 to illustrate how the pressure release lever 180 releases the pressure applied to the tension roller by the first presser 170*a* and the second presser 170*b*, and FIGS. 21A and 21B are enlarged plan views of a part around the pressure release lever. FIG. 22 is a diagram illustrating an example of the operation of the pressure release lever 180.

Pushing the pressure release lever 180 in the direction indicated by an arrow F5 in FIGS. 20 and 21B moves the contact projections 180*c* of the pressure release lever 180 to push the contacted faces 172*e* of the front and rear pressing arms 172F and 172R of the first presser 170*a* and the second presser 170*b*. As a result, the ends of the front and rear pressing arms 172F and 172R that are ends close to the center of the tension roller assembly 160 in the front-back direction move together in the directions indicated by arrows F6 in FIG. 20 against the biasing forces of the front and rear coil springs 171F and 171R. Then, the front pressing arm 172F pivots about the pivot shaft 169*a* as a fulcrum, and the rear pressing arm 172R pivots about the pivot shaft 169*b* as a fulcrum. Pivoting the front pressing arm 172F and the rear pressing arm 172R moves the pressing portions 172*c* of the front pressing arm 172F and the rear pressing arm 172R in the directions indicated by the arrows F7 in FIG. 20.

When the pressing portions 172*c* move in the directions indicated by the arrows F7 in FIG. 20, the weight of the tension roller 16 rotates the rear roller holder 190R in the direction indicated by the arrow F8 in FIG. 22 about the holder support shaft 167*a* as a fulcrum and similarly rotates the front roller holder 190F about the holder support shaft 163*a* as a fulcrum. As a result, the tension roller 16 moves in the direction indicated by the arrow F9 in FIG. 22 and separates from the intermediate transfer belt 8. In other words, the pressure release lever 180 as a pressure releaser moves the first presser 170*a* and the second presser 170*b* together, releases the pressure, and separates the tension roller from the intermediate transfer belt 8.

While the pressure release lever 180 is pushed to release the pressure, the tension roller assembly 160 is moved to the front side to pull out the positioning pins from the positioning holes. The above-described structure enables the positioning pin to be pulled out from the positioning hole while the tension roller 16 is separated from the intermediate transfer belt 8, which prevents the outer circumferential surface of the intermediate transfer belt 8 from being damaged. After the positioning pins are pulled out from the positioning holes, moving the tension roller assembly 160 downward while the pressure release lever 180 is pushed to release the pressure removes the tension roller assembly 160 from the intermediate transfer unit 7.

In the present embodiment, the above-described simple operation of pushing the pressure release lever 180 releases the pressure applied to the tension roller by both the first presser 170*a* and the second presser 170*b*, and the tension roller assembly 160 can be easily attached to and detached from the intermediate transfer unit 7 without damaging the outer circumferential surface of the intermediate transfer belt 8.

The first guide 165 has a grip shape for the operator to grip when the operator removes the tension roller assembly 160 from the intermediate transfer unit 7 while pushing the pressure release lever 180. Specifically, as illustrated in FIG. 22, the pressure release lever 180 protrudes horizontally by 5 to 60 mm (x=5 to 60 mm in FIG. 22), preferably 12.5 mm, from the first guide 165 as a grip. In addition, the first guide 165 as the grip extends downward from the pressure release lever by 30 to 60 mm (y=30 to 60 mm in FIG. 22), preferably 38 mm. As a result, the operator can easily grip the first guide as the grip while pressing the pressure release lever. As illustrated in FIG. 22, the above-described structure enables the operator to grip the tension roller assembly 160 by pushing the pressure release lever 180 with the thumb in a direction to push the pressure release lever 180 and pushing the face of the first guide 165 facing the tension roller with fingers other than the thumb in a direction opposite to the direction to push the pressure release lever 180. In this way, the operator can easily grasp the tension roller assembly 160 with one hand while the operator pushes the pressure release lever 180 to release the pressure. The above-described structure can simplify the attachment and detachment of the tension roller assembly 160.

As illustrated in FIG. 10, the front pressing arm 172F of the first presser 170*a* and the rear pressing arm 172R of the second presser 170*b* in the present embodiment are aligned in the front-back direction of the image forming apparatus. The front and rear pressing arms 172F and 172R aligned in the front-back direction enable the above simple configuration, that is, the pressure release lever 180 disposed at the center of the tension roller assembly in the front-back direction to pivot the front pressing arm 172F of the first presser 170*a* and the rear pressing arm 172R of the second presser 170*b* to release the pressure. The above-described configuration can reduce the number of components, miniaturize the tension roller assembly 160, and prevent an increase in the cost of the tension roller assembly 160.

Figure 23:
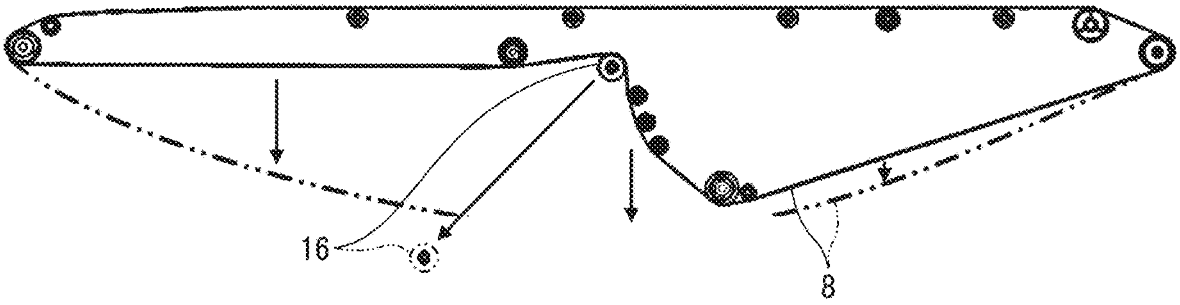
FIG. 23 is a schematic diagram illustrating an intermediate transfer belt before and after a tension roller assembly is removed from an intermediate transfer unit.

Pulling out the intermediate transfer unit 7 and removing the tension roller assembly 160 changes the intermediate transfer belt 8 from the state indicated by the solid line in FIG. 23 to the slack state indicated by the long dashed double-short dashed line. When the intermediate transfer belt 8 is loosened, the primary transfer rollers 9Y, 9M, 9C, and 9K and the secondary-transfer backup roller 12 in the loop of the intermediate transfer belt 8 can be removed from the frame housing 80 to replace with new rollers.

In order to replace the intermediate transfer belt 8, the tension roller assembly 160 is removed, and then the inner cover 90, the front face plate 120*a*, and the front face plate 120*b* are removed.

Figure 24A:
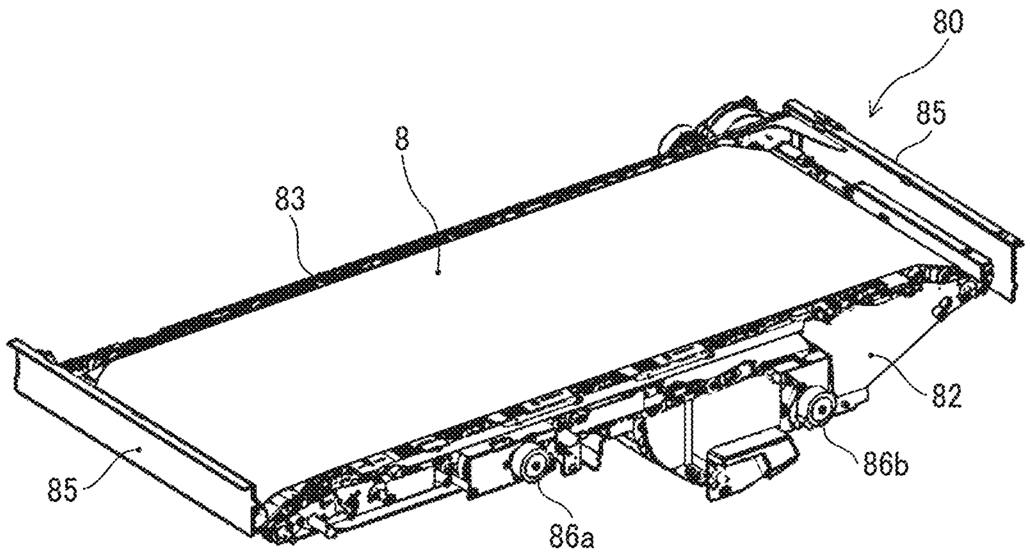
FIG. 24A is a perspective view of an intermediate transfer unit from which an inner cover and front face plates are removed.
Figure 24B:
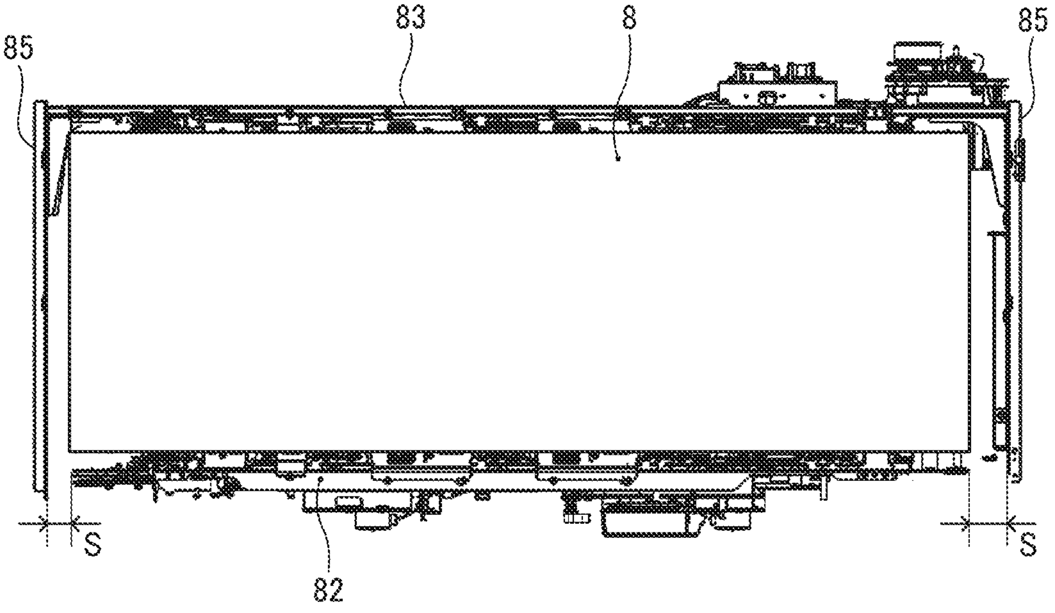
FIG. 24B is a plan view of the intermediate transfer unit of FIG. 24A.

FIG. 24A is a perspective view of the intermediate transfer unit 7 from which the inner cover 90 and the front face plates 120*a* and 120*b* are removed, and FIG. 24B is a plan view of the intermediate transfer unit 7 of FIG. 24A.

As illustrated in FIGS. 24A and 24B, the front frame 82 is shorter than the distance from one of the lateral frames to the other lateral frame in the right and left direction of the image forming apparatus. A specified gap S is formed between the front frame 82 of the frame housing 80 and a lateral frame 85. Removing the inner cover 90 and the front face plates 120*a* and 120*b* forms a passage to pull out the intermediate transfer belt 8 from the intermediate transfer unit 7. In this manner, the intermediate transfer belt 8 can be removed from the intermediate transfer unit 7 by passing the loosened intermediate transfer belt 8 through the gap S.

As described above, in the present embodiment, the inner cover 90 is removed to exchange the intermediate transfer belt 8. However, the tension roller assembly 160, the lubrication device 200, and the belt cleaner 100, which are supported by the frame housing 80 of the intermediate transfer unit 7, the primary transfer rollers 9Y, 9M, 9C, and 9K and the stretching roller such as the secondary-transfer backup roller 12, which are inside the loop of the intermediate transfer belt 8, can be replaced without removing the inner cover 90. Such a configuration can shorten the time required for maintenance of the intermediate transfer unit 7.

The above-described embodiments are illustrative and do not limit this disclosure. Thus, numerous additional modifications and variations are possible in light of the above teachings. For example, elements and/or features of different illustrative embodiments may be combined with each other and/or substituted for each other within the scope of this disclosure.

The configurations according to the above-described embodiments are examples, and embodiments of the present disclosure are not limited to the above. For example, the following aspects can achieve effects described below.

First Aspect

In a first aspect, a tension roller assembly includes a tension roller such as the tension roller 16, a first presser such as the first presser 170*a*, a second presser such as the second presser 170*b*, and a pressure releaser such as the pressure release lever 180. The tension roller contacts an outer circumferential surface of a belt such as the intermediate transfer belt 8 to apply tension to the belt. The first presser presses one end of the tension roller in an axial direction of the tension roller against the belt. The second presser presses another end of the tension roller in the axial direction against the belt. The pressure releaser moves the first presser and the second presser together to releases pressure applied to the tension roller by the first presser and the second presser.

According to the first aspect, as described in the embodiments, the operator operates the pressure releaser and can release the pressure applied to the tension roller by both pressers. In the related art, the operator removes the loop of the tension spring of the first presser from a hook and remove the loop of the tension spring of the second presser form another hook to release the pressure applied to the tension roller by the first presser and the second presser. In the configuration according to the first aspect, the operator can more easily release the pressure applied to the tension roller by the first presser and the second presser than in the configuration in the related art. As a result, the configuration according to the first aspect can simplify the operation of releasing the pressure.

Second Aspect

In a second aspect, the tension roller assembly according to the first aspect further includes a first roller holder such as the front roller holder 190F and a second roller holder such as the rear roller holder 190R. The first roller holder holds the one end of the tension roller such as the tension roller 16 in the axial direction. The second roller holder holds the another end of the tension roller in the axial direction. The first presser such as the first presser 170*a* includes a first pressing arm such as the front pressing arm 172F pivotably pressing the first roller holder in a first pressing direction. The second presser such as the second presser 170*b* includes a second pressing arm such as the rear pressing arm 172R pivotably pressing the second roller holder in the first pressing direction. The first pressing arm and the second pressing arm are aligned in the axial direction.

According to the second aspect, as described in the embodiments, the pressure releaser such as the pressure release lever 180 is disposed between the first pressing arm of the first presser and the second pressing arm of the second presser (in other words, the center of the tension roller assembly in a direction in which the first pressing arm and the second pressing arm are aligned). Pushing the pressure releaser pushes an end of the first pressing arm and an end of the second pressing arm that are ends close to the center of the tension roller assembly in the axial direction and pivots the first pressing arm of the first presser and the second pressing arm of the second presser together to release the pressure applied to the tension roller by the first presser and the second presser. As a result, the configuration according to the second aspect does not use a complicated mechanism such as a link mechanism but can release the pressure applied to the tension roller by the first presser and the second presser. Accordingly, the configuration according to the second aspect can prevent an increase in the cost of the image forming apparatus and reduce the size of the image forming apparatus.

Third Aspect

In a third aspect, the tension roller assembly according to the second aspect includes the first pressing arm such as the front pressing arm 172F having one end that contacts the first roller holder such as the front roller holder 190F and another end closer to a center of the tension roller assembly than the one end in the axial direction and the second pressing arm such as the rear pressing arm 172R having one end that contacts the second roller holder such as the rear roller holder 190R and another end closer to the center of the tension roller assembly than the one end in the axial direction. The pressure releaser such as the pressure release lever 180 includes a pressure release lever contacting the another end of the first pressing arm and the another end of the second pressing arm. The pressure release lever movably presses the another end of the first pressing arm and the another end of the second pressing arm in a second pressing direction opposite to the first pressing direction, to release the pressure applied to the tension roller by the first presser such as the first presser 170*a* and the second presser such as the second presser 170*b*.

As described in the embodiments, the configuration according to the third aspect does not use a complicated mechanism such as a link mechanism but can simultaneously release the pressure applied to the tension roller by the first presser and the second presser. Accordingly, the configuration according to the third aspect can prevent an increase in the cost of the image forming apparatus and to reduce the size of the image forming apparatus.

Fourth Aspect

In a fourth aspect, the tension roller assembly according to the third aspect further includes a grip such as the first guide 165, and the pressure release lever such as the pressure release lever 180 is on the grip.

According to the fourth aspect, as described in the embodiments, the operator can release the pressure applied to the tension roller by the first presser and the second presser, separate the tension roller such as the tension roller 16 from the belt such as the intermediate transfer belt 8 a state where the tension roller 16 is separated from the intermediate transfer belt 8, and remove the tension roller assembly such as the tension roller assembly 160 from the belt unit such as the intermediate transfer unit, which can prevent the tension roller from damaging the outer circumferential surface of the belt. In addition, the grip such as the first guide 165 enables the tension roller assembly to easily remove from the belt unit while the pressure applied to the tension roller by the first presser and the second presser is released.

Fifth Aspect

In a fifth aspect, the tension roller assembly according to any one of the first to fourth aspects further includes a guide such as the first guide 165 or the second guide 166 to guide a unit such as the belt cleaner 100 or the lubrication device 200 attachable to and detachable from a belt unit such as the intermediate transfer unit 7 including the belt such as the intermediate transfer belt 8.

According to the fifth aspect, as described in the embodiments, the unit attachable to and detachable from the belt unit, such as the belt cleaner 100 or the lubrication device 200, can be easily attached to or detached from the belt unit.

Sixth Aspect

In a sixth aspect, a belt unit such as the intermediate transfer unit 7 includes the belt such as the intermediate transfer belt 8 and the tension roller assembly such as the tension roller assembly 160 according to any one of the first to fifth aspects.

According to the sixth aspect, the tension applied to the belt can be easily released.

Seventh Aspect

In a seventh aspect, an image forming apparatus includes the belt unit according to the sixth aspect.

Eighth Aspect

In an eighth aspect, the image forming apparatus according to the seventh aspect further includes slide rails such as the slide rails 81, and the belt unit includes a housing such as the frame housing, a cover such as the inner cover 90, and a door such as the small transfer door 70. The housing is attached to the slide rails to support a roller stretching the belt and the tension roller assembly. The cover covers a front side plate of the housing. The door covers the tension roller assembly.

The configuration according to the eighth aspect can shorten the maintenance operation time of the belt unit such as the intermediate transfer unit to be shorter than the maintenance operation time of a configuration in which removing the cover such as the inner cover 90 enables the tension roller assembly such as the tension roller assembly 160 to be removed from the belt unit.

Ninth Aspect

In a ninth aspect, the image forming apparatus according to the eighth aspect further includes a fastener such as the screw 89 fastening the tension roller assembly such as the tension roller assembly 160 to the belt unit such as the intermediate transfer unit, and the door such as the small transfer door 70 covers the fastener.

The configuration according to the ninth aspect enables the tension roller assembly such as the tension roller assembly 160 to be removed from the belt unit without removing the cover such as the inner cover 90.

Tenth Aspect

In a tenth aspect, a tension roller assembly includes a tension roller such as the tension roller 16, a first pressing arm such as the front pressing arm 172F, a first elastic body such as the front coil spring 171F, a second pressing arm such as the rear pressing arm 172R, a second elastic body such as the rear coil spring 171R, and a pressure releaser such as the pressure release lever 180. The first elastic body presses the first pressing arm such that one end of the first pressing arm presses one end of the tension roller in an axial direction of the tension roller. The second elastic body presses the second pressing arm such that one end of the second pressing arm presses another end of the tension roller in the axial direction. The pressure releaser contacts another end of the first pressing arm opposite to the one end of the first pressing arm and another end of the second pressing arm opposite to the one end of the second pressing arm and is movable against a force of the first elastic body and a force of the second elastic body.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A tension roller assembly comprising:

a tension roller configured to contact an outer circumferential surface of a belt to apply tension to the belt;

a first presser configured to press a first end of the tension roller in an axial direction of the tension roller against the belt;

a second presser configured to press a second end of the tension roller in the axial direction against the belt;

a pressure releaser configured to move the first presser and the second presser together to release pressure applied to the tension roller by the first presser and the second presser;

a first roller holder configured to hold the first end of the tension roller in the axial direction; and a second roller holder configured to hold the second end of the tension roller in the axial direction, wherein the first presser includes a first pressing arm configured to pivotably press the first roller holder in a first pressing direction, the second presser includes a second pressing arm configured to pivotably press the second roller holder in the first pressing direction, and the first pressing arm and the second pressing arm are aligned in the axial direction.

2. The tension roller assembly according to claim 1, wherein the first pressing arm includes a first end contacting the first roller holder and a second end closer to a center of the tension roller assembly in the axial direction than the first end;

the second pressing arm includes a first end contacting the second roller holder and a second end closer to the center of the tension roller assembly than the first end; and the pressure releaser includes a pressure release lever configured to contact the second end of the first pressing arm and the second end of the second pressing arm, the pressure releaser configured to be movable to pivot the first pressing arm and the second pressing arm to release pressure applied to the tension roller by the first presser and the second presser in a direction opposite to a direction in which the first pressing arm and the second pressing arm pivot to press the first roller holder and the second roller holder.

3. The tension roller assembly according to claim 2, further comprising:

a grip, wherein the pressure release lever is on the grip.

4. The tension roller assembly according to claim 1, further comprising:

a guide configured to guide a device attachable to and detachable from a belt housing, the belt housing including the belt.

5. A belt housing comprising:

the belt; and the tension roller assembly according to claim 1.

6. An image forming apparatus comprising:

the belt housing according to claim 5.

7. The image forming apparatus according to claim 6, further comprising:

slide rails, wherein the belt housing includes:

a housing attached to the slide rails, the housing configured to support a roller stretching the belt and the tension roller assembly;

a cover configured to cover a front side plate of the housing; and a door configured to cover the tension roller assembly.

8. The image forming apparatus according to claim 7, further comprising:

a fastener configured to fasten the tension roller assembly to the belt housing, wherein the door is further configured to covers the fastener.

9. The tension roller assembly according to claim 1, further comprising:

a lubrication device configured to apply lubricant to a surface of the belt.

10. The tension roller assembly according to claim 9, further comprising:

a belt cleaner configured to remove residual toner from the surface of the belt.

11. The tension roller assembly according to claim 10, further comprising:

a first guide and a second guide, wherein the lubrication device and the belt cleaner are configured to attach and detach from the first guide and the second guide, respectively.

12. A tension roller assembly comprising:

a tension roller;

a first pressing arm;

a first elastic body configured to press the first pressing arm such that a first end of the first pressing arm presses a first end of the tension roller in an axial direction of the tension roller;

a second pressing arm;

a second elastic body configured to press the second pressing arm such that a first end of the second pressing arm presses a second end of the tension roller in the axial direction; and a pressure releaser configured to contact a second end of the first pressing arm opposite to the first end of the first pressing arm and a second end of the second pressing arm opposite to the first end of the second pressing arm, the pressure releaser further configured to be movable against a force of the first elastic body and a force of the second elastic body.

13. The tension roller assembly according to claim 12, further comprising:

a first roller holder configured to hold the first end of the tension roller in the axial direction;

a second roller holder configured to hold the second end of the tension roller in the axial direction;

the first elastic body includes the first pressing arm;

the first pressing arm is further configured to pivotably press the first roller holder in a first pressing direction;

the second elastic body includes the second pressing arm;

the second pressing arm is further configured to pivotably press the second roller holder in the first pressing direction; and the first pressing arm and the second pressing arm are aligned in the axial direction.

14. The tension roller assembly according to claim 13, wherein the pressure releaser includes a pressure release lever; and the pressure release lever is on a grip.

15. The tension roller assembly according to claim 14, wherein the first end of the first pressing arm is configured to contact the first roller holder;

the second end of the first pressing arm is closer to a center of the tension roller assembly in the axial direction than the first end of the first pressing arm;

the first end of the second pressing arm is configured to contact the second roller holder;

the second end of the second pressing arm is closer to the center of the tension roller assembly than the first end of the second pressing arm; and the pressure releaser includes a pressure release lever configured to contact the second end of the first pressing arm and the second end of the second pressing arm, the pressure releaser configured to be movable to pivot the first pressing arm and the second pressing arm to release pressure applied to the tension roller by the first elastic body and the second elastic body in a direction opposite to a direction in which the first pressing arm and the second pressing arm pivot to press the first roller holder and the second roller holder.

16. A belt housing comprising:

a belt; and the tension roller assembly according to claim 12.

17. An image forming apparatus comprising:

the belt housing according to claim 16.

18. An image forming apparatus comprising:

a belt; and a tension roller assembly including, a tension roller configured to contact an outer circumferential surface of the belt to apply tension to the belt;

a first presser configured to press a first end of the tension roller in an axial direction of the tension roller against the belt;

a second presser configured to press a second end of the tension roller in the axial direction against the belt;

a pressure releaser configured to move the first presser and the second presser together to release pressure applied to the tension roller by the first presser and the second presser;

a first roller holder configured to hold the first end of the tension roller in the axial direction; and a second roller holder configured to hold the second end of the tension roller in the axial direction, wherein the first presser includes a first pressing arm configured to pivotably press the first roller holder in a first pressing direction, the second presser includes a second pressing arm configured to pivotably press the second roller holder in the first pressing direction, and the first pressing arm and the second pressing arm are aligned in the axial direction.

19. The image forming apparatus according to claim 18, wherein the first pressing arm includes a first end contacting the first roller holder and a second end closer to a center of the tension roller assembly in the axial direction than the first end;

the second pressing arm includes a first end contacting the second roller holder and a second end closer to the center of the tension roller assembly than the first end; and the pressure releaser includes a pressure release lever configured to contact the second end of the first pressing arm and the second end of the second pressing arm, the pressure releaser configured to be movable to pivot the first pressing arm and the second pressing arm to release pressure applied to the tension roller by the first presser and the second presser in a direction opposite to a direction in which the first pressing arm and the second pressing arm pivot to press the first roller holder and the second roller holder.

20. The image forming apparatus according to claim 19, further comprising:

a grip, wherein the pressure release lever is on the grip.

* * * * *